US012608692B2

(12) United States Patent
Kasamatsu

(10) Patent No.: US 12,608,692 B2
(45) Date of Patent: Apr. 21, 2026

(54) SYSTEM, COMMUNICATION TERMINAL, METHOD, AND RECORDING MEDIUM

(71) Applicant: Takuma Kasamatsu, Tokyo (JP)

(72) Inventor: Takuma Kasamatsu, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 194 days.

(21) Appl. No.: 17/896,130

(22) Filed: Aug. 26, 2022

(65) Prior Publication Data

US 2022/0414623 A1 Dec. 29, 2022

Related U.S. Application Data

(63) Continuation of application No. PCT/JP2021/005941, filed on Feb. 17, 2021.

(30) Foreign Application Priority Data

Feb. 28, 2020 (JP) ................................. 2020-033466
Feb. 4, 2021 (JP) ................................. 2021-016740

(51) Int. Cl.
*G06Q 20/10* (2012.01)
*G06Q 20/14* (2012.01)
*G06Q 20/38* (2012.01)

(52) U.S. Cl.
CPC ........... *G06Q 20/10* (2013.01); *G06Q 20/145* (2013.01); *G06Q 20/3825* (2013.01);
(Continued)

(58) Field of Classification Search
CPC .. G06Q 20/10; G06Q 20/145; G06Q 20/3825; G06Q 20/3829; G06Q 20/389; G06Q 2220/00
See application file for complete search history.

(56) References Cited

U.S. PATENT DOCUMENTS 10,257,184 B1 * 4/2019 Mehta ................... H04L 67/306
2002/0069176 A1 * 6/2002 Newman ............... G06Q 20/24
705/40

(Continued)

FOREIGN PATENT DOCUMENTS

JP 2001-357017 12/2001
JP 2004-040738 2/2004
(Continued)

OTHER PUBLICATIONS

International Search Report issued on Mar. 23, 2021 in PCT/JP2021/005941 filed on Feb. 17, 2021, 6 pages.

*Primary Examiner* — John W Hayes
*Assistant Examiner* — Zehra Raza
(74) *Attorney, Agent, or Firm* — XSENSUS LLP

(57) ABSTRACT

A first communication terminal receives, from a second communication terminal, use request information indicating a request by a user for using a particular service of one or more services provided by a provider. The first communication terminal transmits to a management system information indicating an amount of currency information for using the particular service, and provides the particular service to the second communication terminal in response to reception of a notification from the management system, the notification indicating completion of transfer of currency information from the user to the provider for the indicated amount.

17 Claims, 18 Drawing Sheets

(52) U.S. Cl.
  CPC ....... *G06Q 20/3829* (2013.01); *G06Q 20/389*
              (2013.01); *G06Q 2220/00* (2013.01)

(56)                    References Cited

U.S. PATENT DOCUMENTS

2014/0047093  A1*   2/2014  Short ................... G06Q 50/163
                                                      709/223
2018/0211232  A1*   7/2018  Cacheria, III  ......... G06Q 20/10
2020/0090096  A1*   3/2020  Inokuchi .......... G06Q 10/06315
2020/0100259  A1*   3/2020  Tanaka ................. H04W 16/14

FOREIGN PATENT DOCUMENTS

JP        2015-177453       10/2015
JP        2019-004263        1/2019
JP        2020-030454        2/2020
WO    WO 2018/220709  A1    12/2018
WO    WO 2018/220746  A1    12/2018

* cited by examiner

NETWORK SYSTEM 1

BLOCKCHAIN 8

NODE 80

INTERNET 5

COMMUNICATION NETWORK

APPLICATION MANAGEMENT APPARATUS 70

PROVIDER TERMINAL 30

USER TERMINAL 10

FIG. 7A

ACCESS RIGHT MANAGEMENT TABLE

| USER ID | ACCESS RIGHT |
|---------|--------------|
| userA | NO |
| userB | YES |
| userC | NO |
| userD | YES |
| ... | ... |

FIG. 7B

APPLICATION MANAGEMENT TABLE

| ACCESS RIGHT | APPLICATION URL |
|--------------|-----------------|
| NO | https://ooo.com/··· |
| YES | https://xxx.com/··· |

FIG. 8

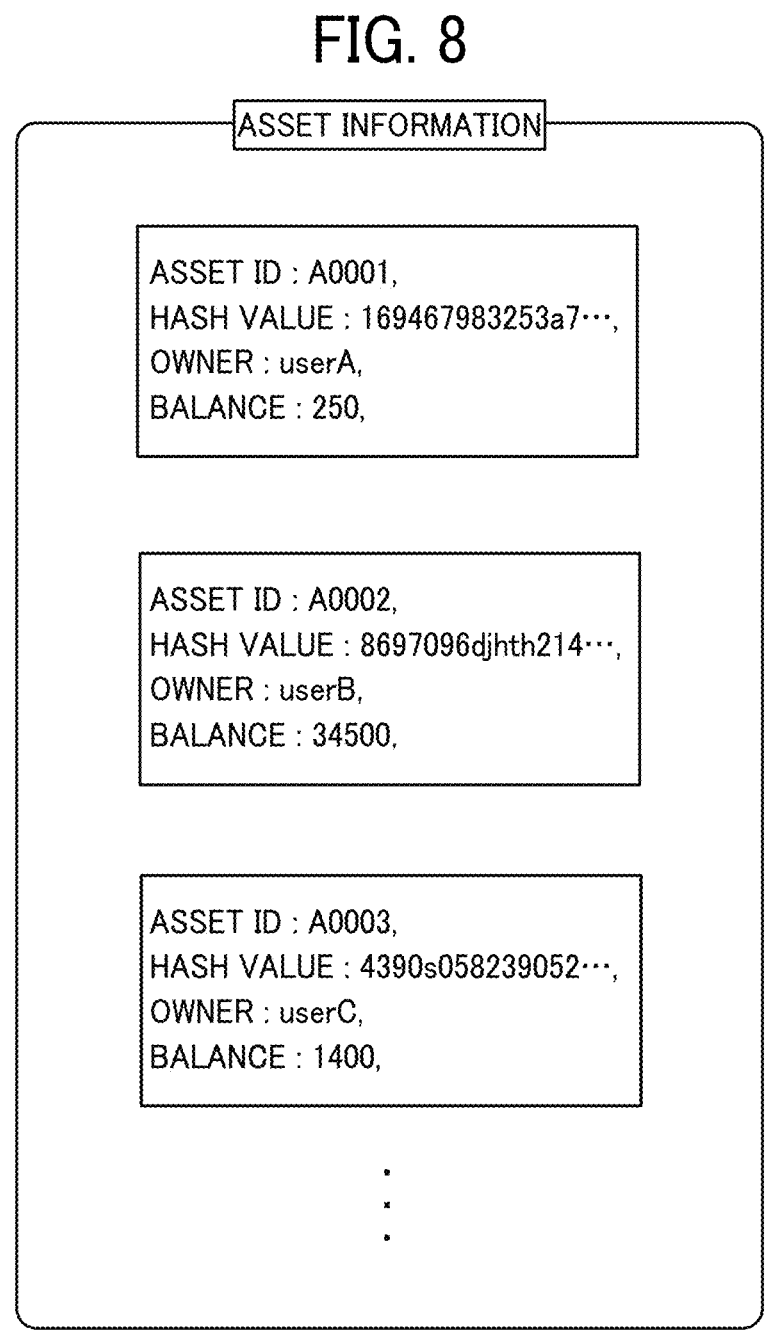

ASSET INFORMATION

ASSET ID : A0001,
HASH VALUE : 169467983253a7···,
OWNER : userA,
BALANCE : 250,

ASSET ID : A0002,
HASH VALUE : 8697096djhth214···,
OWNER : userB,
BALANCE : 34500, ASSET ID : A0003,
HASH VALUE : 4390s058239052···,
OWNER : userC,
BALANCE : 1400,

Figure 13:
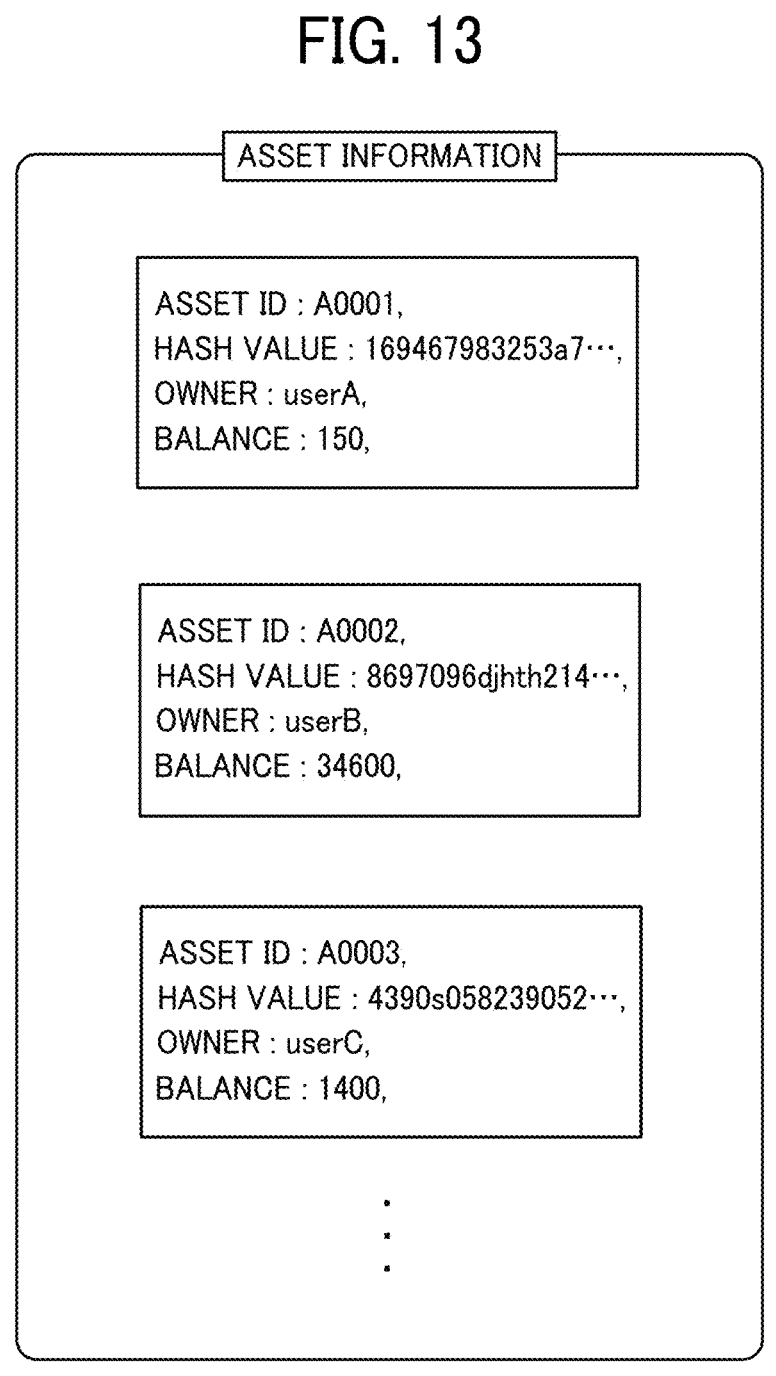

ASSET INFORMATION

ASSET ID : A0001,
HASH VALUE : 169467983253a7···,
OWNER : userA,
BALANCE : 150,

ASSET ID : A0002,
HASH VALUE : 8697096djhth214···,
OWNER : userB,
BALANCE : 34600, ASSET ID : A0003,
HASH VALUE : 4390s058239052···,
OWNER : userC,
BALANCE : 1400,

TRANSACTION INFORMATION

TRANSACTION ID : T0009,
TRANSACTION TYPE : ASSET
CONSUMPTION,
TIME STAMP : 2020/1/18/20:21:43,
ASSET ID : A0001,
HASH VALUE : 169467983253a7···,
OWNER : userA,
CONSUMPTION : 100, TRANSACTION ID : T0010,
TRANSACTION TYPE : ASSET
ALLOCATION,
TIME STAMP : 2020/1/18/20:21:45,
ASSET ID : A0002,
HASH VALUE : 8697096djhth214···,
OWNER : userB
ALLOCATION : 100,

SYSTEM, COMMUNICATION TERMINAL, METHOD, AND RECORDING MEDIUM

CROSS-REFERENCE TO RELATED APPLICATIONS

This patent application is a continuation application of International Application No. PCT/JP2021/005941, filed on Feb. 17, 2021, which claims priority to Japanese Patent Application Nos. 2020-033466, filed on Feb. 28, 2020, and 2021-016740, filed on Feb. 4, 2021, in the Japan Patent Office, the entire disclosure of which is hereby incorporated by reference herein.

BACKGROUND

Technical Field

Embodiments of the present invention relate to a system, communication terminal, method, and recording medium.

Related Art

In the known technology, a provider provides a service to a user terminal operated by a user, by charging fee for such service and allowing the user to process payment via a communication network, such as using currency information.

SUMMARY

Example embodiments include a system including: a first communication terminal communicably connected with a management system that manages currency information, the first communication terminal including first circuitry; and a second communication terminal communicably connected with the first communication terminal, the second communication terminal including second circuitry. The second circuitry transmits use request information indicating a request by a user for using a particular service of one or more services provided by a provider. The first circuitry transmits, to the management system, information indicating an amount of currency information for using the particular service of the use request information, and provides the particular service to the second communication terminal in response to reception of a notification from the management system, the notification indicating completion of transfer of currency information from the user to the provider for the indicated amount.

Example embodiments include a method for providing a service, performed by a communication terminal communicably connected with a management system that manages currency information. The method includes: receiving, from a user terminal, use request information indicating a request by a user for using a particular service of one or more services provided by a provider; transmitting, to the management system, information indicating an amount of currency information for using the particular service of the use request information; and providing the particular service to the user terminal in response to reception of a notification from the management system, the notification indicating completion of transfer of currency information from the user to the provider for the indicated amount.

Example embodiments include a non-transitory recording medium which, when executed by one or more processors, cause the processors on a communication terminal to perform a method for providing a service, the communication terminal being communicably connected with a management system that manages currency information. The method includes: receiving, from a user terminal, use request information indicating a request by a user for using a particular service of one or more services provided by a provider; transmitting, to the management system, information indicating an amount of currency information for using the particular service of the use request information; and providing the particular service to the user terminal in response to reception of a notification from the management system, the notification indicating completion of transfer of currency information from the user to the provider for the indicated amount.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 7A is a conceptual diagram illustrating an example of an access right management table according to an embodiment;

FIG. 7B is a conceptual diagram illustrating an example of an application management table according to an embodiment;

FIG. 8 is a conceptual diagram illustrating an example of asset information stored in a node according to an embodiment;

FIG. 13 is a conceptual diagram illustrating an example of asset information updated at step S26;

3

Figure 16:
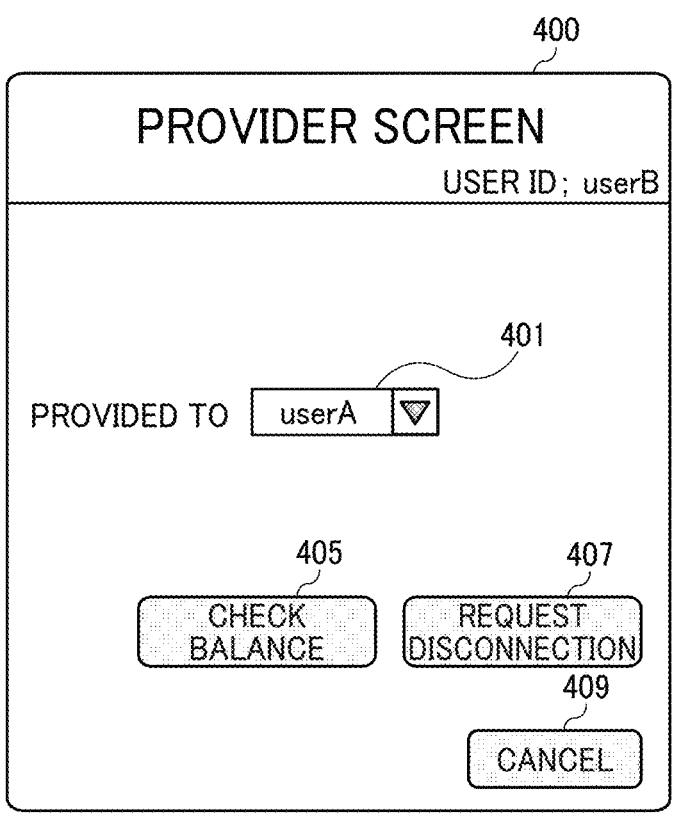
Figure 17A:
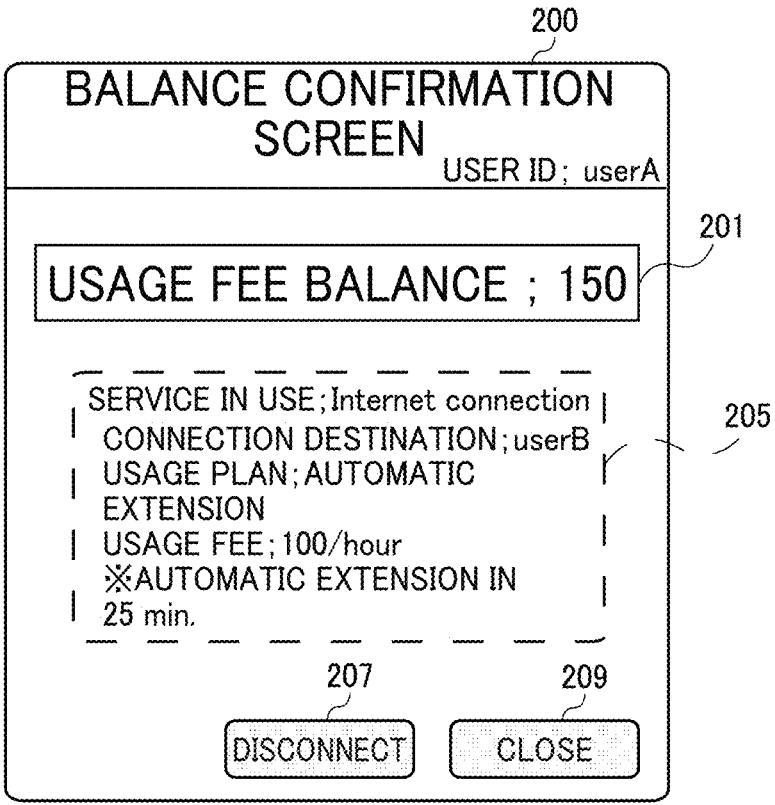
Figure 17B:
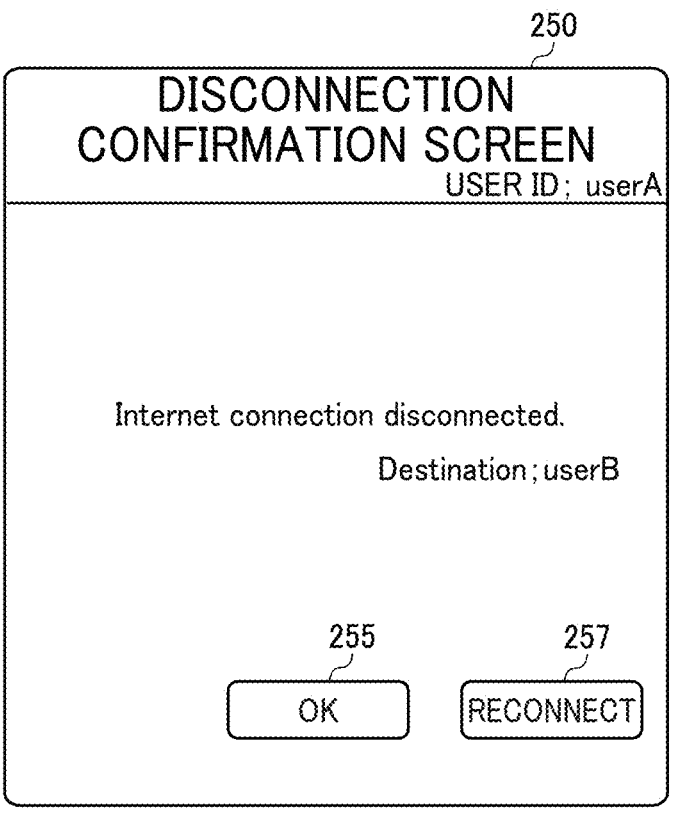

FIG. 16 is an illustration of an example provider screen displayed at the provider terminal according to an embodiment;

FIG. 17A is an illustration of an example balance confirmation screen displayed at the user terminal according to an embodiment; and FIG. 17B is an illustration of an example disconnection confirmation screen displayed at the user terminal according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present invention will be described with reference to the drawings. In the description of the drawings, the same components are denoted by the same reference numerals, and the description thereof will be omitted.

System Configuration

Figure 1:
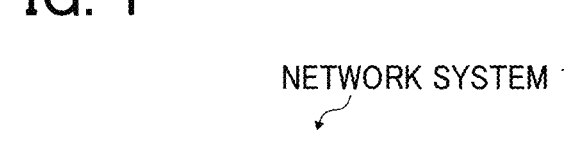
FIG. 1 is a diagram illustrating an example of a system configuration of a network system according to an embodiment.

FIG. 1 is a diagram illustrating an example of a system configuration of a network system according to an embodiment. In the network system 1 illustrated in FIG. 1, a provider terminal 30 provides services to a user terminal 10 based on transactions using currency information.

The network system 1 includes the user terminal 10, the provider terminal 30, and an application management apparatus 70. The provider terminal 30 and the application management apparatus 70 are connected to each other via Internet 5.

The network system 1 further includes a blockchain 8 configured by a plurality of nodes 80. The node 80 is, for example, a smartphone, a tablet terminal, a mobile phone, or a PC (personal computer). The blockchain 8 utilizes a distributed ledger technology (distributed network) for enabling users to share information (ledger). The blockchain 8 makes transaction information open to the public, and allows all users to check legitimacy of the transaction information, to carry out transactions (contracts) without fraud. The blockchain 8 includes the plurality of nodes 80 each used by a particular user. The user rewrites or checks the information managed by the blockchain 8 at his or her node 80. That is, the plurality of nodes 80 implementing the blockchain 8 each store and manage the same transaction information.

While the blockchain 8 is desirably used in this disclosure, any other system capable of managing transfer of currency information between the provider and the user may be used. In this disclosure, the blockchain 8 is an example of management system that manages currency information of users.

The Internet 5 and the blockchain 8 reside on a communication network. The communication network is constructed by a local area network (LAN), a dedicated line, or a mobile communication network. The communication network may include not only a wired communication network but also a wireless communication network such as 5G (5th generation), WiFi (wireless fidelity (Registered Trademark)), WiMAX (Worldwide interoperability for Microwave Access), or LTE (long term evolution).

The user terminal 10 is a terminal device such as a smartphone used by a user of services provided from the provider terminal 30. The user terminal 10 does not have an access right to the blockchain 8. The user terminal 10 can directly connect to the communication network and the Internet 5 on the communication network, but cannot directly communicate with the blockchain 8 (or any node 80 implementing the blockchain 8) on the communication network. Further, the user terminal 10 performs transactions in relation to use of the services via the provider terminal 30. The user terminal 10 is not limited to a smartphone, and may be a tablet terminal, a mobile phone, a PC, or the like.

The provider terminal 30 is a terminal device that provides services to the user terminal 10. The provider terminal 30 is used by a provider of services at the network system 1. The provider terminal 30 has an access right to the blockchain 8, and is communicably connected to the blockchain 8 on the communication network. The provider terminal 30 can be connected to the Internet 5 on the communication network. The provider terminal 30 may be a portable terminal (mobile terminal) such as a portable smartphone, a tablet terminal, a mobile phone, or a notebook PC, or may be a stationary terminal installed at a predetermined site. The network system 1 may further include a plurality of provider terminals 30.

The application management apparatus 70 is a server apparatus that manages Web applications for allowing use of services provided at the network system 1. The application management apparatus 70 provides the user terminal 10 and the provider terminal 30 with a Web application corresponding to the access right of the user. The application management apparatus 70 may be implemented by a plurality of computers that together carry out its functions that are distributed over the computers. Although the application management apparatus 70 is described as a server computer existing in a cloud environment, the application management apparatus 70 may be a server existing in an on-premise environment.

Hardware Configuration

Figure 2:
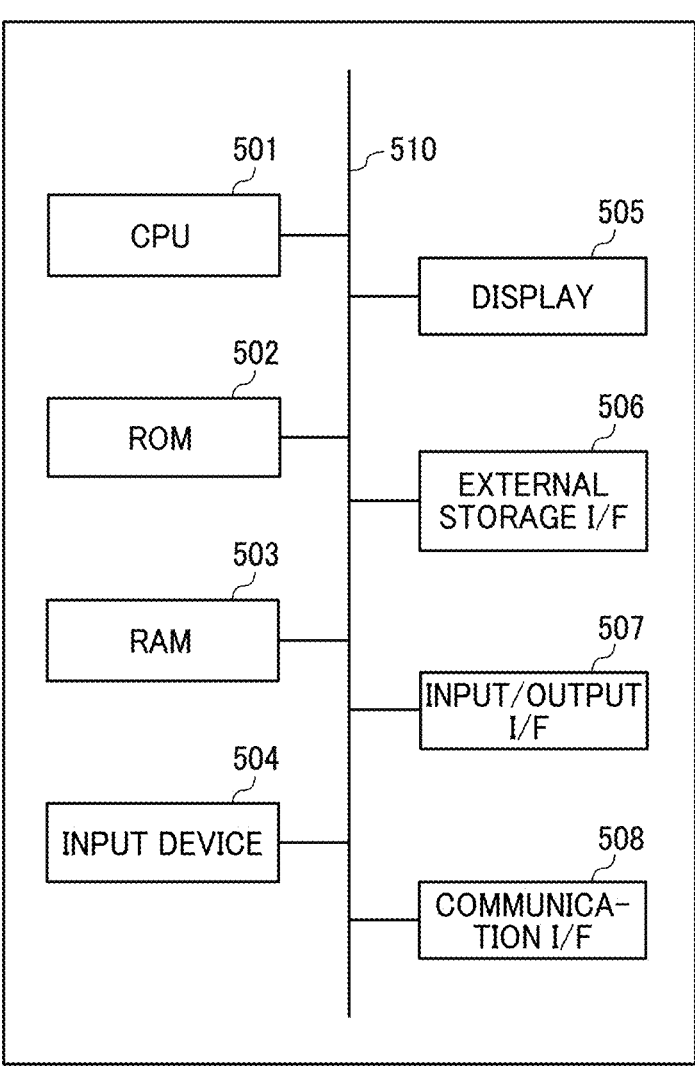
FIG. 2 is a diagram illustrating an example of a hardware configuration of a computer according to an embodiment.

Next, referring to FIG. 2, a hardware configuration of each device of the network system 1 is described. Any component may be added to or removed from the hardware configuration illustrated in FIG. 2 as needed. The devices on the network system 1 each have a configuration as a general-purpose computer. In the following, an example of a hardware configuration of the general-purpose computer is described.

FIG. 2 is a diagram illustrating an example of a hardware configuration of the computer according to the embodiment. The computer includes a CPU (central processing unit) 501, a ROM (read only memory) 502, a RAM (random access memory) 503, an input device 504, a display 505, an external storage I/F (interface) 506, an input/output I/F 507, and a communication I/F 508.

The CPU 501 controls entire operation of the computer. The ROM 502 is a non-volatile memory that stores a program used to activate the CPU 501. The RAM 503 is a volatile memory used as a work area for the CPU 501. The input device 504 is an example of input means that receives operation input by a user. The input device 504 is, for example, a keyboard, a mouse, a touch panel, a button, a dial, or a microphone for voice input.

The display 505 is an example of display means such as a liquid crystal display or an organic EL (electro lumines-cence) display, which displays various kinds of information such as a cursor, a menu, a window, a character, an icon, or an image. The external storage I/F 506 controls reading or writing (storage) with respect to an external storage such as a recording medium. The input/output I/F 507 is an interface for connecting to external devices to enable input or output of various data or information between various types of external device.

The communication I/F 508 is an interface for transmit-ting data with other computers. The communication I/F 508 is, for example, a communication interface such as a wired or wireless LAN. Note that the communication I/F $08 may include a communication interface based on such as 3G (3rd Generation), LTE (Long Term Evolution), 4G (4th Genera-tion), 5G, Wi-Fi, WiMAX, Zigbee (Registered Trademark), or millimeter wave wireless communication. Examples may also include an interface for short-range wireless commu-nication such as NFC (Near Field Communication) or BLE (Bluetooth Low Energy (Registered Trademark)). The com-puter also includes a bus line 510. The bus line 510 is, for example, an address bus or a data bus for electrically connecting the components such as the CPU 501.

Any of the above-described programs may be stored in a computer-readable recording medium as a file in an install-able format or an executable format for distribution. Examples of the recording medium include a CD-R (com-pact disc recordable), a DVD (digital versatile disk), a Blu-ray disc (Registered Trademark), an SD card, and a USB memory. In addition, the recording medium can be provided domestically or abroad as a program product. For example, the provider terminal 30 according to the embodi-ment executes the program to implement a method for providing services.

Overview

Figure 3:
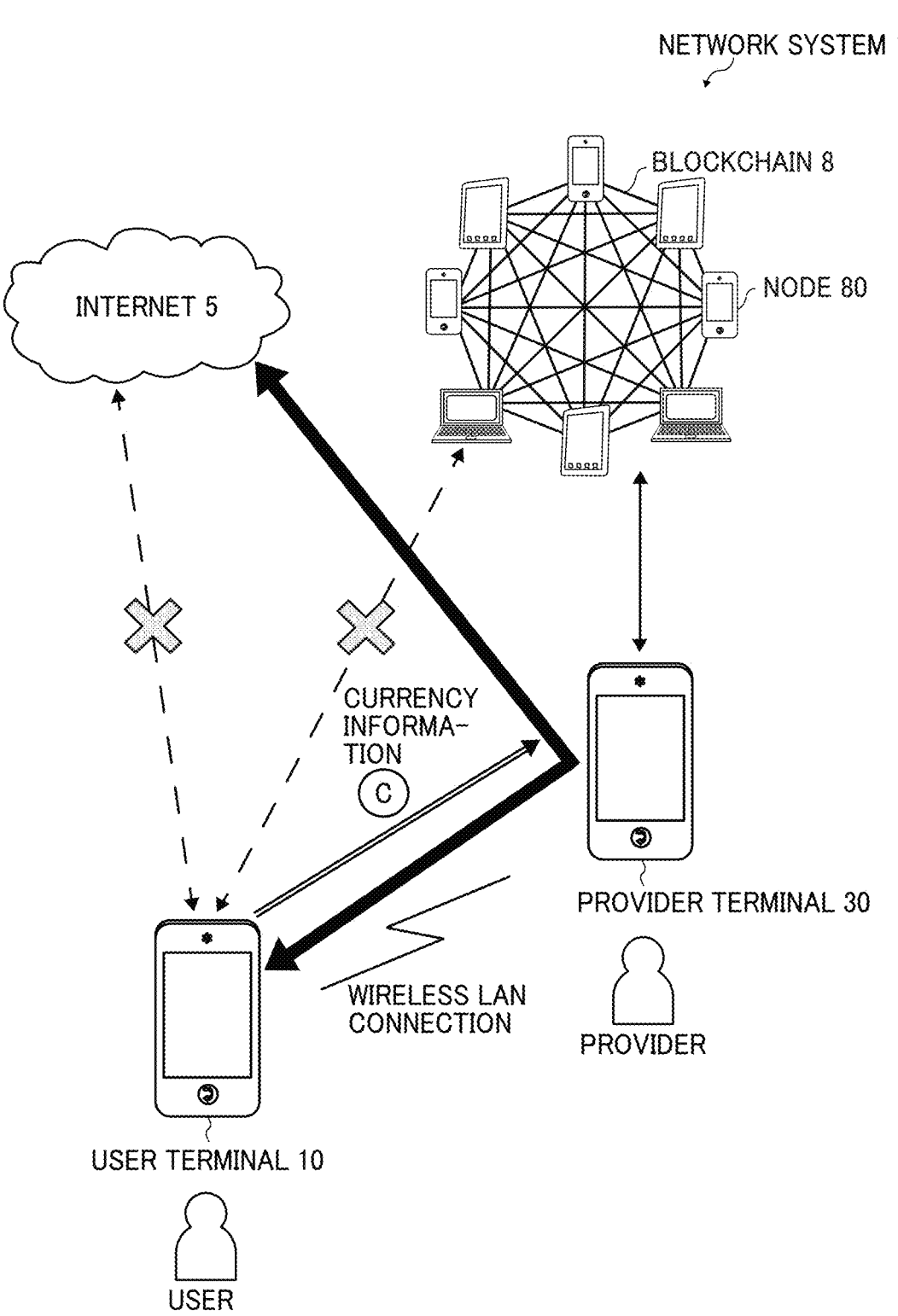
FIG. 3 is a diagram schematically illustrating an example of a network system according to an embodiment.
Figure 4:
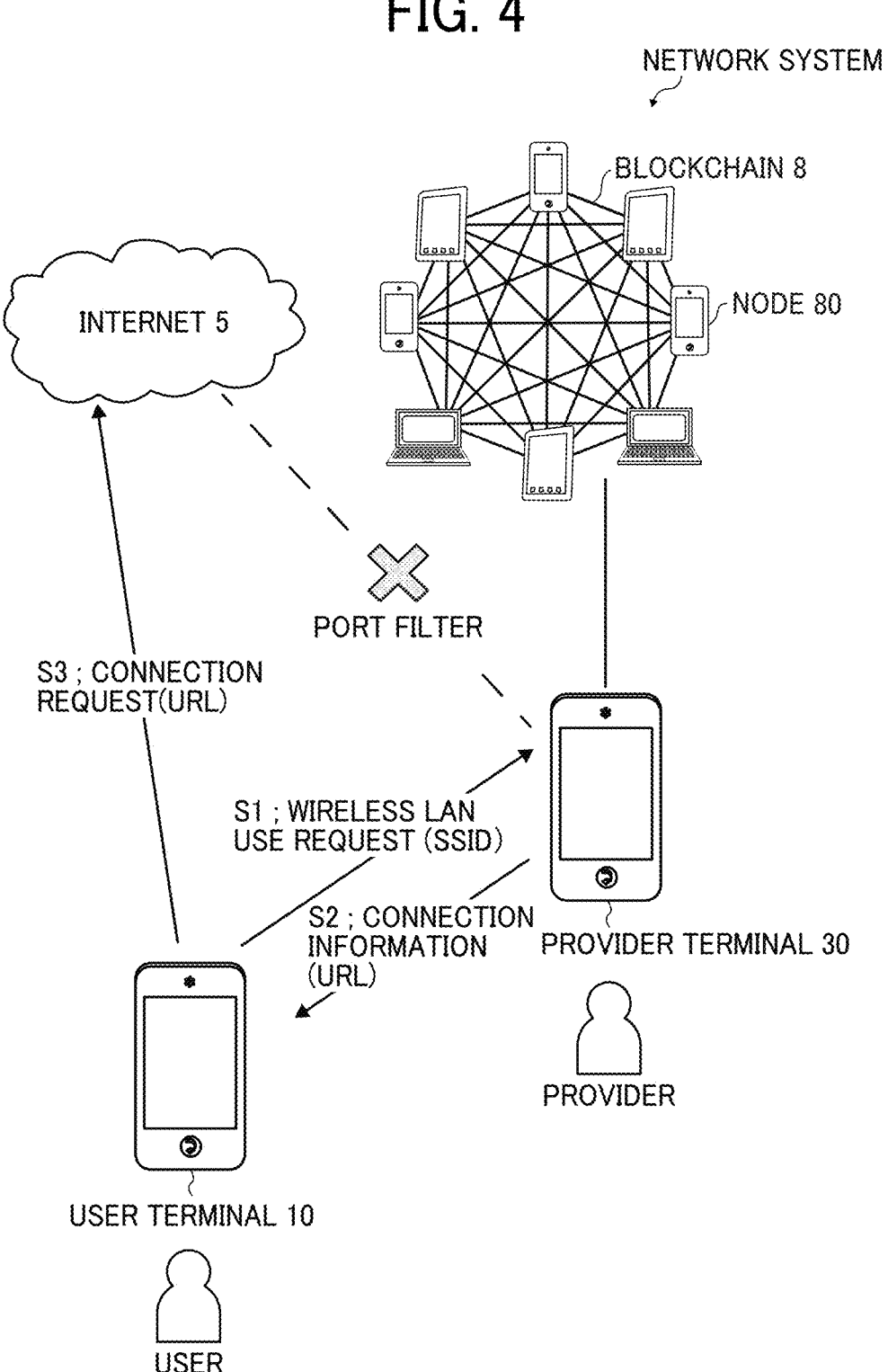
FIG. 4 is a diagram illustrating an example of an outline of processing of the network system according to an embodiment.
Figure 5:
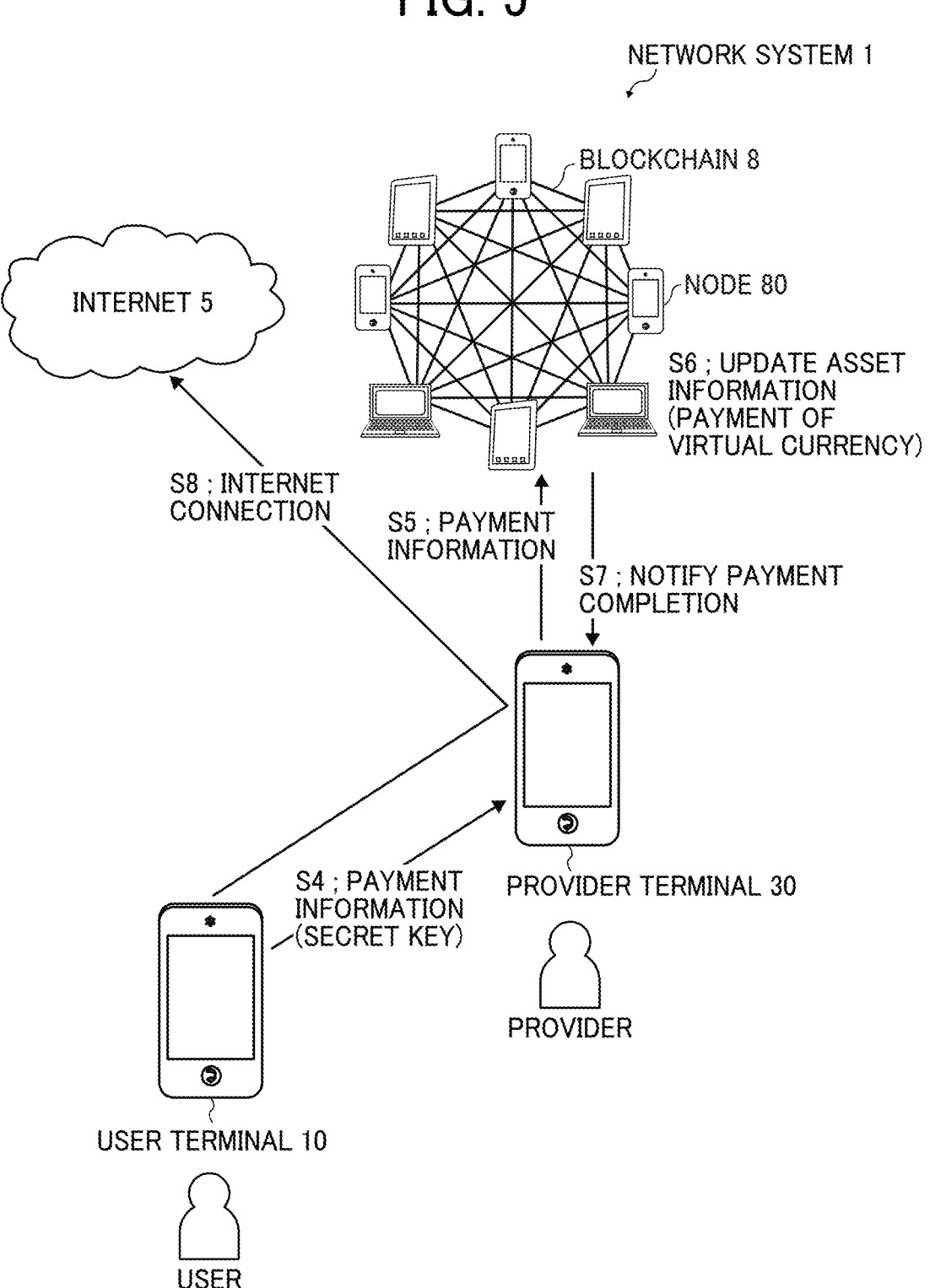
FIG. 5 is a diagram illustrating an example of an outline of processing performed by the network system according to an embodiment.

Next, referring to FIGS. 3 to 5, an overview of the network system according to the embodiment is described. Note that FIGS. 3 to 5 schematically illustrate the network system according to the embodiment, and details of func-tions and the like of the network system 1 are described with reference to drawings and the like described later.

FIG. 3 is a diagram schematically illustrating an example of the network system according to the embodiment. The network system 1 includes a system that carries out trans-actions of currency information, which is a usage fee for services, between the provider terminal 30 used by the provider of the services and the user terminal 10 used by the user of the services. In this disclosure, the currency infor-mation is digital currency such as virtual currency used in transactions between users on the communication network.

The user and the provider each possess currency infor-mation. The currency information possessed by each user is managed on the blockchain 8. Specifically, the user and the provider can carry out transactions such as transmitting and receiving of payment, based on the currency information managed on the blockchain 8.

The user terminal 10 is a terminal whose connection to the communication network is restricted, such that it cannot access the Internet 5 and the blockchain 8 on the commu-nication network. In order to access the Internet 5, the user terminal 10 is provided with wireless LAN connection service via the provider terminal 30, and the user pays currency information as a usage fee of the wireless LAN to the provider. In FIGS. 3 to 5, a configuration of a service of connecting to the Internet 5 will be described as an example of a service provided from the provider terminal 30 to the user terminal 10.

FIGS. 4 and 5 are diagrams illustrating an example of an outline of processing performed by the network system according to the embodiment. First, the user terminal 10 selects a SSID disclosed by the service provider, and trans-mits a wireless LAN use request to the provider terminal 30 (step S1). In response to the use request from the user terminal 10, the provider terminal 30 executes the applica-tion for the provider to redirect the connection information for accessing a payment screen for paying the usage fee of the wireless LAN to the user terminal 10 (step S2). The connection information is, for example, a URL of an appli-cation for the user.

Next, the user terminal 10 displays a payment screen by accessing the URL as a connection request for the URL transmitted from the provider terminal 30 (step S3). In this state, at the provider terminal 30, for example, a port filter controls to reject communication at a specific communica-tion port, such that the connection from the user terminal 10 to the Internet 5 is restricted. Accordingly, the user terminal 10 can access only the application URL transmitted from the provider terminal 30.

In FIG. 5, the user terminal 10 transmits payment infor-mation including data input to the payment screen to the provider terminal 30 (step S4). This payment information is digitally signed by the user's own private key. The provider terminal 30 transmits the payment information transmitted from the user terminal 10 to the blockchain 8 (step S5).

Next, the node 80 of the blockchain 8 updates the cur-rency information of the user, which is registered asset information (step S6). Thus, the blockchain 8 performs a payment transaction of the currency information between the user and the provider. Then, the node 80 transmits a payment completion notification indicating that the payment of the usage fee is completed to the provider terminal 30 (step S7).

When the provider terminal 30 receives the payment completion notification, for example, the provider terminal 30 changes a setting of the port filter to control to permit communication through the specific communication port, thus connecting the user terminal 10 to the Internet 5 (step S8). The user terminal 10 can access the Internet 5 via the provider terminal 30.

Conventionally, it was necessary to connect a user termi-nal to a communication network in order for a user to perform a transaction of currency information on the com-munication network as payment of a usage fee for a service. This may create a problem in security, since connection information for connecting to the communication network needs be disclosed. In view of this, the network system 1 performs a transaction of currency information, which is a service usage fee from the user terminal 10, via the provider terminal 30 that can communicate with the blockchain 8. Accordingly, the network system 1 can perform a transaction of currency information on the blockchain 8 even when the connection to the communication network is restricted at the user terminal 10. This allows transaction of currency infor-mation with a reduced security risk.

Further, an authentication system such as RADIUS (Remote Authentication Dial-In User Service) is used for user authentication on the communication network, and many servers such as an authentication server and an access server are required. In view of this, the network system 1 uses the blockchain 8 that manages the currency information owned by the user. The network system 1 is a mechanism, which uses payment information electronically signed with a private key owned by a user himself or herself, and verifies whether or not the payment information is fraudulent by another user using the blockchain 8. Therefore, the network system 1 can reduce the number of servers such as an authentication server for user authentication. The network system 1 uses payment information, electronically signed, for transactions, and verifies presence or absence of fraud among a plurality of users by using the blockchain 8. This prevents impersonation by other users, thus reducing security risks.

Functional Configuration

Figure 6:
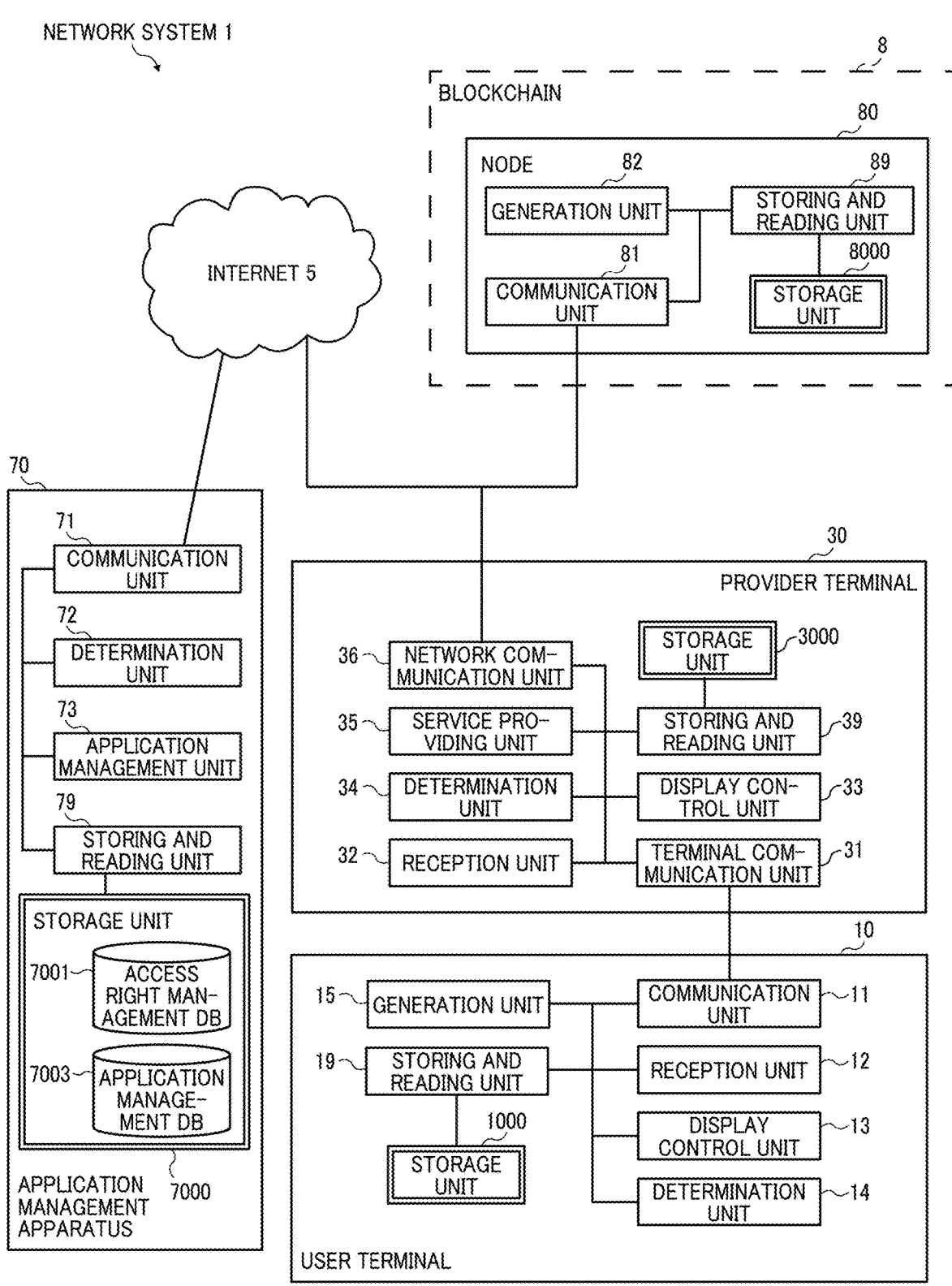
FIG. 6 is a diagram illustrating an example of a functional configuration of the network system according to an embodiment.

Next, referring to FIG. 6, a functional configuration of the network system according to the embodiment is described. FIG. 6 is a diagram illustrating an example of a functional configuration of the network system according to the embodiment. FIG. 6 illustrates a part of the terminals or devices of FIG. 1, which are related to processes or operations described later.

Functional Configuration of User Terminal

First, referring to FIG. 6, a functional configuration of the user terminal 10 is described. The user terminal 10 includes a communication unit 11, a reception unit 12, a display control unit 13, a determination unit 14, a generation unit 15, and a storing and reading unit 19. These units are functions that are implemented by, or means for achieving such functions, by any of the components illustrated in FIG. 2 that operate under instructions by the CPU 501 according to a program expanded from the ROM 502 onto the RAM 503. The user terminal 10 further includes a storage unit 1000 implemented by the ROM 502 illustrated in FIG. 2 or an external storage.

The communication unit 11 is implemented by instructions from the CPU 501 and the communication I/F 508 illustrated in FIG. 2, and has a function of performing communication of various data or information with an external device. The communication unit 11 transmits, for example, payment information indicating a usage fee of a service provided from the provider terminal 30, to the provider terminal 30.

The reception unit 12 is implemented by instructions from the CPU 501 and the input device 504 illustrated in FIG. 2, and has a function of receiving various inputs from the user to the input device 504. The display control unit 13 is implemented by instructions from the CPU 501 and the display 505 illustrated in FIG. 2, and has a function of causing the display 505 to display various screens such as an operation screen for receiving an input operation by the user. The determination unit 14 is implemented by instructions from the CPU 501 illustrated in FIG. 2, and has a function of performing various determinations.

The generation unit 15 is implemented by instructions from the CPU 501 illustrated in FIG. 2, and has a function of generating a digital signature for data transmitted from the communication unit 11. For example, the generation unit 15 generates payment information in which data input to a payment screen 150 described below is electronically signed using a private key.

The storing and reading unit 19 is executed by instructions from the CPU 501 illustrated in FIG. 2. The storing and reading unit 19 stores various types of data in the storage unit 1000, or reads various types of data from the storage unit 1000.

Functional Configuration of Provider Terminal

Next, referring to FIG. 6, a functional configuration of the provider terminal 30 is described. The provider terminal 30 includes a terminal communication unit 31, a reception unit 32, a display control unit 33, a determination unit 34, a service providing unit 35, a network communication unit 36, and a storing and reading unit 39. These units are functions that are implemented by, or means for achieving such functions, by any of the components illustrated in FIG. 2 that operate under instructions by the CPU 501 according to a program expanded from the ROM 502 onto the RAM 503. The provider terminal 30 further includes a storage unit 3000 implemented by the ROM 502 illustrated in FIG. 2 or an external storage.

The terminal communication unit 31 is implemented by instructions from the CPU 501 and the communication I/F 508 illustrated in FIG. 2, and has a function of performing communication of various data or information with the user terminal 10. For example, the terminal communication unit 31 receives use request information indicating a request for use of a particular service from the user terminal 10. Further, the terminal communication unit 31 transmits, for example, connection destination information indicating a connection destination of an application corresponding to the user to the user terminal 10.

The reception unit 32 is implemented by instructions from the CPU 501 and the input device 504 illustrated in FIG. 2, and has a function of receiving various inputs from the user to the input device 504. The display control unit 33 is implemented by instructions from the CPU 501 and the display 505 illustrated in FIG. 2, and has a function of causing the display 505 to display various screens such as an operation screen for receiving an input operation by the user. The determination unit 34 is implemented by instructions from the CPU 501 illustrated in FIG. 2, and has a function of performing various determinations.

The service providing unit 35 is implemented by instructions from the CPU 501 and the communication I/F 508 illustrated in FIG. 2, and provides services to the user terminal 10. One example of the services provided by the service providing unit 35 is a connection service to the Internet 5. For example, when the payment completion notification transmitted from the blockchain 8 is received at the communication unit 31, the service providing unit 35 executes a process of connecting the user terminal 10 to the Internet 5.

The network communication unit 36 is implemented by instructions from the CPU 501 and the communication I/F 508 illustrated in FIG. 2, and has a function of performing communication with an external device via a communication network. For example, the network communication unit 36 transmits payment information for paying the usage fee of the service to the blockchain 8. Further, for example, the network communication unit 36 receives connection destination information indicating a connection destination of an application available to a user from the application management apparatus 70 that manages applications available to the user (user or provider). The application available to the user is an application that the user is authorized to access for use.

The storing and reading unit 39 is executed by instructions from the CPU 501 illustrated in FIG. 2. The storing and reading unit 39 stores various types of data in the storage unit 3000, or reads various types of data from the storage unit 3000.

Functional Configuration of Service Management Apparatus

Next, referring to FIG. 6, a functional configuration of the application management apparatus 70 is described. The application management device 70 includes a communication unit 71, a determination unit 72, an application management unit 73, and a storing and reading unit 79. These units are functions that are implemented by, or means for achieving such functions, by any of the components illustrated in FIG. 2 that operate under instructions by the CPU 501 according to a program expanded from the ROM 502 onto the RAM 503. The application management apparatus 70 further includes a storage unit 7000 implemented by the ROM 502 illustrated in FIG. 2 or an external storage.

The communication unit 71 is implemented by instructions from the CPU 501 and the communication I/F 508 illustrated in FIG. 2, and has a function of performing communication of various data or information with an external device via the Internet 5. For example, the communication unit 71 transmits connection destination information indicating a connection destination of an application available to the user to the provider terminal 30.

The determination unit 72 is implemented by instructions from the CPU 501 illustrated in FIG. 2, and has a function of performing various determinations. The application management unit 73 is implemented by instructions from the CPU 501 illustrated in FIG. 2, and manages applications used in the network system 1.

The storing and reading unit 79 is executed by instructions from the CPU 501 illustrated in FIG. 2. The storing and reading unit 79 stores various types of data in the storage unit 7000, or reads various types of data from the storage unit 7000.

Access Right Management Table

FIG. 7A is a conceptual diagram illustrating an example of an access right management table according to the embodiment. The storage unit 7000 includes an access right management DB 7001, implemented by an access right management table illustrated in FIG. 7A. The access right management table stores and manages an access right to the blockchain 8 for each user. The access right management table stores a plurality of access rights in association with a plurality of user IDs each for identifying a particular user. The user ID is user identification information uniquely assigned to each user, such as a UUID (universally unique identifier) or a GUID (globally unique identifier). As illustrated in FIG. 7A, the user IDs "user A" and "user C" are associated with access right with "NO", indicating that the user A and the user C do not have access rights to the blockchain 8. On the other hand, the user IDs "user B" and "user D" are associated with access right with "YES", indicating that the user B and the user D have access rights to the blockchain 8.

In this disclosure, the access right to the blockchain 8 is a right to rewrite or check data on the blockchain 8. Specifically, a user who is a provider of services and uses the provider terminal 30 is given access right (access right "YES"), and a user who is a user of services and uses the user terminal 10 is not given access right. In other words, the access right is a right to become a provider of services in the network system 1.

Application Management Table

FIG. 7B is a conceptual diagram illustrating an example of an application management table according to the embodiment. The storage unit 7000 includes an application management DB 7003, implemented by an application management table as illustrated in FIG. 7B. The application management table stores and manages an application URL (Uniform Resource Locator) for each access right to the blockchain 8. The application management table is set with an application URL indicating a connection destination different for each access right. The application URL is an example of connection destination information. The connection destination information includes a URI (Uniform Resource Identifier) for accessing a particular application.

In this disclosure, at application to be executed by accessing the application URL with the access right "YES", that is, an application used by the provider terminal 30, provides, for example, a service providing function and a Web user interface (UI). The provider terminal 30 performs network usage restriction, which is an example of the service providing function, by accessing the corresponding application URL, for example. The provider terminal 30 uses the application for the service provider to control whether or not the user terminal 10 can connect to the Internet 5. Further, the provider terminal 30 uses the application for the service provider to display a display screen for performing various inputs for providing the service to the user.

In addition, an application to be executed by accessing the application URL with the access right of "NO", that is, an application used by the user terminal 10, provides a currency payment function and a Web UI. For example, the user terminal 10 accesses the corresponding application URL to perform payment of currency information, which is a usage fee of the service. Further, the user terminal 10 uses the application for the user of the service to display a display screen such as a payment screen for payment of the currency information.

Functional Configuration of Node

Next, referring to FIG. 6, a functional configuration of the node 80 implementing the blockchain 8 is described. It is assumed that the plurality of nodes 80 of the blockchain 8 each have the same function. The node 80 includes a communication unit 81, a generation unit 82, and a storing and reading unit 89. These units are functions that are implemented by, or means for achieving such functions, by any of the components illustrated in FIG. 2 that operate under instructions by the CPU 501 according to a program expanded from the ROM 502 onto the RAM 503. The node 80 further includes a storage unit 8000 implemented by the ROM 502 illustrated in FIG. 2 or an external storage.

The communication unit 81 is implemented by instructions from the CPU 501 and the communication I/F 508 illustrated in FIG. 2, and has a function of performing communication of various data or information with an external device. The communication unit 81 receives, for example, payment information transmitted from the provider terminal 30.

The generation unit 82 is implemented by instructions from the CPU 501 illustrated in FIG. 2, and has a function of generating data to be stored in the node 80 of the blockchain 8. The generation unit 82 generates, for example, asset information and transaction information to be stored in the node 80. In this disclosure, the asset information is currency information used for transaction on the blockchain 8. The transaction information is information in which a transaction history of currency information on the blockchain 8 is continuously stored. Details of the asset information and the transaction information will be described later.

The storing and reading unit 89 is executed by instructions from the CPU 501 illustrated in FIG. 2. The storing and reading unit 89 stores various types of data in the storage unit 8000, or reads various types of data from the storage unit 8000.

Asset Information

FIG. 8 is a conceptual diagram illustrating an example of asset information stored in a node according to the embodiment. The storage unit 8000 stores asset information including currency information exchanged on the blockchain 8. The asset information stores, for each asset ID for identifying an asset, various information such as a hash value numbered for each asset, an owner, and a balance of virtual currency owned by the owner, in association with each other. For example, asset information in relation to an asset ID "A0001" includes a hash value "169467983253a7 . . . ", an owner "user A", and a balance "250". As described above, the blockchain 8 manages information on the virtual currency owned by the user, as asset information for each user.

In this disclosure, the virtual currency includes what is called cryptocurrency, and corresponds to a concept defined by cryptographic data or the like (update of a ledger, approval of a transaction, or the like) on the communication network. In addition, similarly to the legal currency, the virtual currency includes those capable of performing exchange between different types of virtual currencies, exchange between the legal currency and the virtual currency, exchange between the virtual currency and goods or services, or the like. The virtual currency is an example of currency information used in a transaction using the network system 1. For example, the currency information may be electronic money, points issued for each service by charging from the user, or the like.

Processing or Operation of Embodiments

Service Providing Processing

Next, referring to FIGS. 9 to 16, processes or operation of the network system according to the embodiment are described. In the following description, an example in which processing is performed with one node 80 of the blockchain 8 is described. However, the provider terminal 30 may be configured to perform processing with any node 80 of the blockchain 8.

Figure 9:
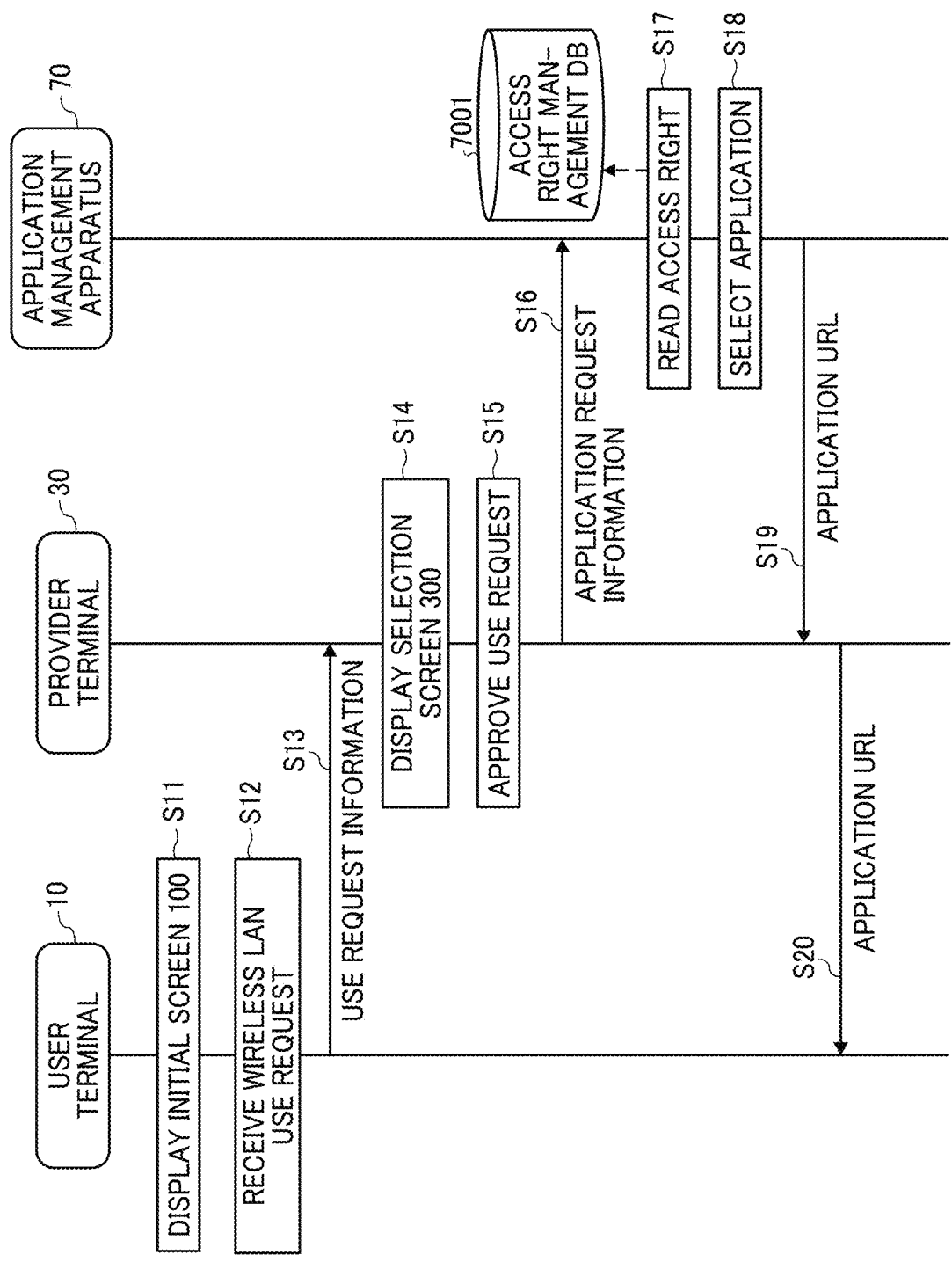
FIG. 9 is a sequence diagram illustrating an example of a service usage method in the network system according to the embodiment.
Figure 10A:
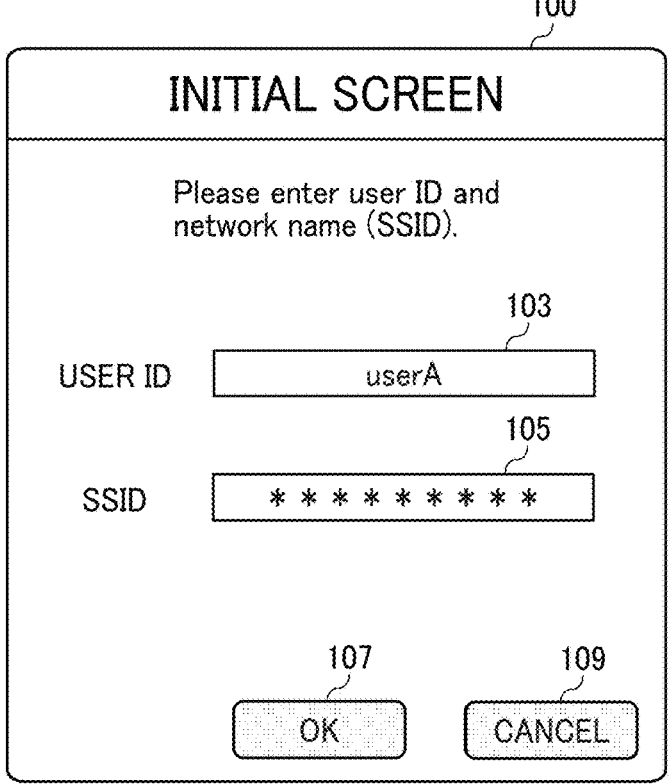
FIG. 10A is an illustration of an example initial screen displayed at a user terminal according to an embodiment.
Figure 10B:
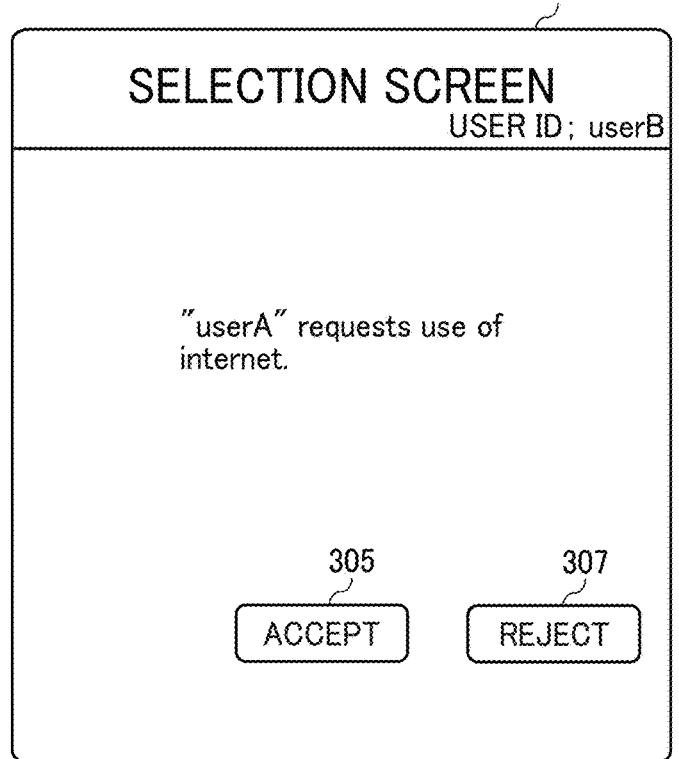
FIG. 10B is an illustration of an example selection screen displayed at a provider terminal according to an embodiment.
Figure 11:
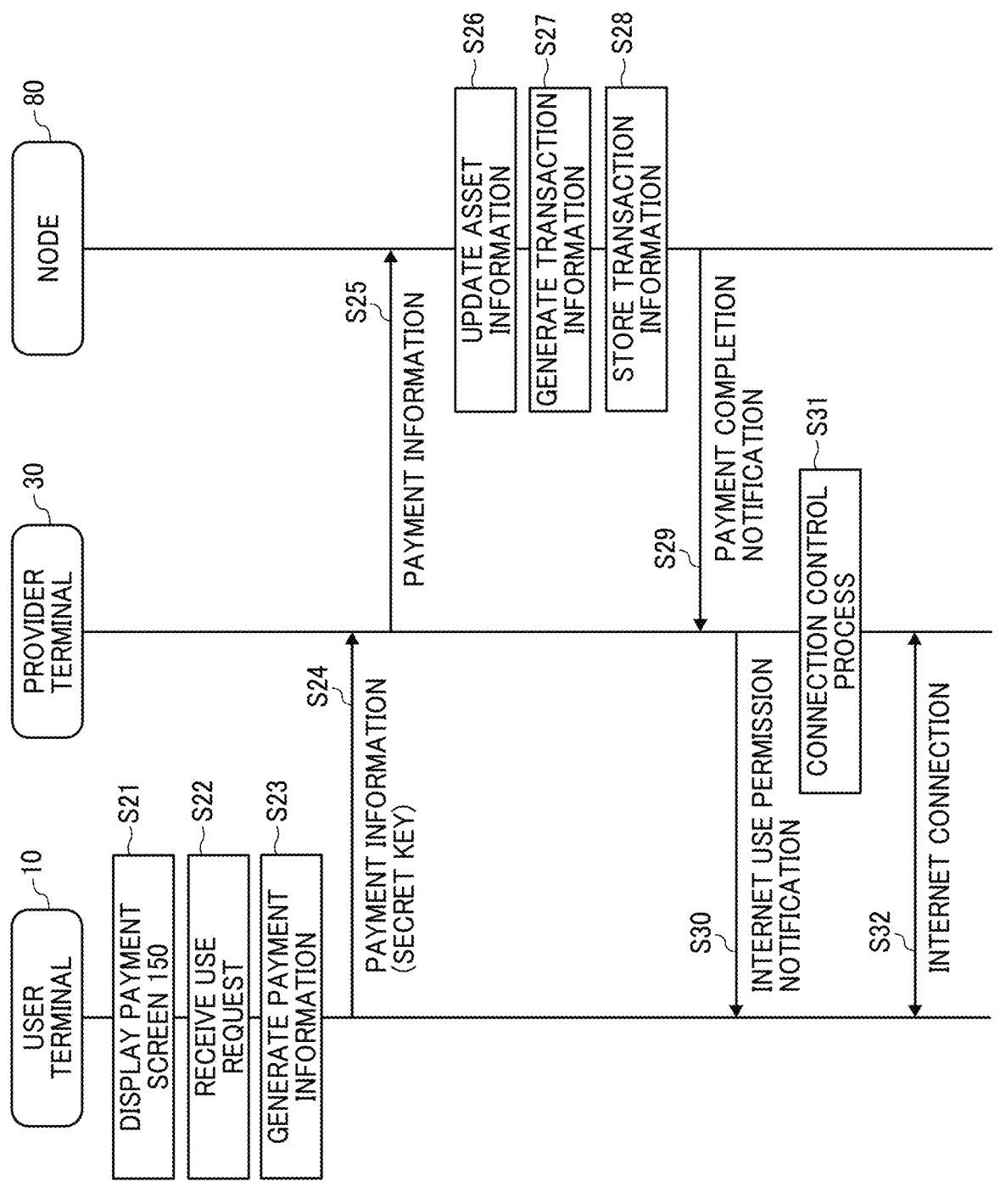
FIG. 11 is a sequence diagram illustrating an example of a service usage method performed by the network system according to an embodiment.

First, referring to FIGS. 9 to 13, processing of using a service provided from the provider terminal 30 by the user is described. FIGS. 9 and 11 are sequence diagrams illustrating an example of a method for using services in the network system according to the embodiment.

In response to the reception unit 12 receiving a predetermined operation by the user using a web browser or a dedicated application, the display control unit 13 of the user terminal causes the display 505 to display an initial screen 100 for allowing the user to input certain information (step S11). FIG. 10A is an illustration of an example initial screen displayed at the user terminal according to the embodiment. The initial screen 100 illustrated in FIG. 10A includes an input field 103 for inputting a user ID, an input field 105 for inputting a SSID of wireless LAN, an "OK" button 107 to be pressed when making a request to use a wireless LAN, and a "cancel" button 109 to be pressed when canceling the use of a service.

Next, in response to inputting of the user ID and the SSID in the input fields 103 and 105, respectively, and pressing of the "OK" button 107, by the user A, the reception unit 12 receives a request to use the wireless LAN (step S12). It is assumed that the provider terminal 30 publishes the SSID of the wireless LAN.

Then, the communication unit 11 transmits use request information indicating a request for use of the wireless LAN to the provider terminals 30 (step S13). The use request information includes the user ID and the SSID input to the initial screen 100. Accordingly, the terminal communication unit 31 of the provider terminal 30 receives the use request information transmitted from the user terminal 10.

Next, the display control unit 33 of the provider terminal 30 displays a selection screen 300 for selecting whether to approve the request from the user (step S14). FIG. 10B is an illustration of an example selection screen displayed at the provider terminal according to the embodiment. The selection screen 300 illustrated in FIG. 10B is displayed when the Internet use request from the user A is received, and includes an "accept" button 305 to be pressed when accepting the use request and a "reject" button 307 to be pressed when rejecting the use request. When the provider presses the "approve" button 305, the reception unit 32 receives approval to the request for using the wireless LAN (step S15).

The network communication unit 36 transmits application request information indicating a request to use an application to the application management apparatus 70 (step S16). The application request information includes the user ID of the user A received at step S13, and the user ID of the user B using the provider terminal 30. Accordingly, the communication unit 71 of the application management apparatus 70 transmits the application request information transmitted from the provider terminal 30.

Next, the storing and reading unit 79 of the application management apparatus 70 searches the access right management DB 7001 (see FIG. 7A) using the user ID received at step S16 as a search key, to read an access right set for each user (step S17). Specifically, the storing and reading unit 79 reads information such as access right "NO" associated with the user ID "user A" of the user A, and access right "YES" associated with the user ID "user B" of the user B.

Next, the application management unit 73 refers to the application management DB 7003 (see FIG. 7B), and selects an application to be accessed for each user, that is, the user A and the user B (step S18). Specifically, the storing and reading unit 79 reads the URL of the application corresponding to the access right read at step S17. Then, the application management unit 73 selects a URL corresponding to the access right for each user. In the example case of FIG. 7B, a URL "https//ooo.com/." is assigned to a user A who does not have access right, and a URL "https://xxx.com/." is assigned to a user B who has access right.

Next, the communication unit 71 transmits the URL of the application selected by the application management unit 73 to the provider terminal 30 of the request source (step S19). In this case, the communication unit 71 transmits the URL "https://xxx.com/." associated with the user with access right of YES, that is, the user B who is the provider using the provider terminal 30. The communication unit 71 further transmits the URL "https://ooo.com/." associated with the user with access right of NO, that is, the user A who is the user using the user terminal 10. Accordingly, the network communication unit 36 of the provider terminal 30 receives the application URLs transmitted from the application management apparatus 70.

Next, the terminal communication unit 31 of the provider terminal 30 transmits to the user terminal 10 the application URL corresponding to the user of the request source, among the URLs received by the network communication unit 36 (step S20). In this case, the terminal communication unit 31 transmits the URL "https://ooo.com/." for the user A who uses the user terminal 10. Accordingly, the communication unit 11 of the user terminal 10 receives the application URL transmitted from the provider terminal 30.

As described above, the provider terminal 30 redirects the application URL to the user terminal 10. At this time, the user terminal 10 is communicably connected to the provider terminal 30. It is also possible to use a captive portal mechanism in which connection to the Internet 5 is disabled.

Figure 12:
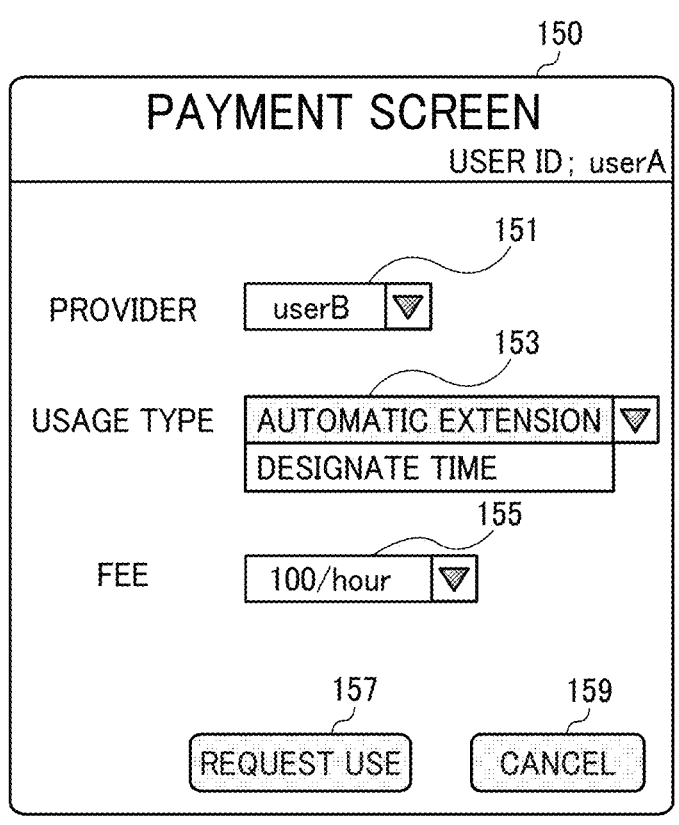
FIG. 12 is an illustration of an example payment screen displayed at the user terminal according to an embodiment.

In FIG. 11, the display control unit 13 of the user terminal 10 accesses the URL received at the communication unit 11, and causes the display 505 to display a payment screen 150 for paying a fee for the service provided by the provider (step S21). FIG. 12 is an illustration of an example payment screen displayed at the user terminal according to the embodiment. The payment screen 150 includes a selection button 151 for selecting a provider who provides a service, a selection button 153 for selecting a usage type of the service, a selection button 155 for selecting a payment fee, a "request use" button 157, and a "cancel" button 159 to be pressed when the use request is canceled. In the example of FIG. 12, the provider "user B", the usage type "automatic extension", and the payment fee "100/hour" are selected.

Next, when the user A selects each item on the payment screen 150 and presses the "request use" button 157, the reception unit 12 receives a request for using the service (step S22). Next, the generation unit 15 electrically signs the data input to the payment screen 150 by using a private key managed at the user terminal 10. Then, the generation unit 15 generates the digitally signed payment information using the private key (step S23).

The communication unit 11 transmits the payment information generated by the generation unit 15 to the provider terminals 30 (step S24). The payment information includes the user ID of the user A and various types of information (provider, usage type, and fee) related to the use request received at step S22. In addition, since the payment information transmitted from the user terminal 10 is digitally signed with the private key owned by the user himself or herself, it is possible to prevent unauthorized impersonation by a third party. Further, the user terminal 10 performs processing of transmitting the payment information through the application for the user, executed by accessing the application URL received at step 20. Accordingly, the communication unit 31 of the provider terminal 30 receives the payment information transmitted from the user terminal 10. The network communication unit 36 of the provider terminal 30 transmits the payment information received at the communication unit 31 to the node 80 by accessing the URL received at step S19 (step S25). Accordingly, the communication unit 81 of the node 80 receives the payment information transmitted from the provider terminal 30.

Next, the generation unit 82 of the node 80 updates the asset information stored in the storage unit 8000 (step S26). FIG. 13 is a conceptual diagram illustrating an example of asset information updated at step S26. As illustrated in FIG. 13, the generation unit 82 changes the balance "250" corresponding to the asset ID "A0001", which is the asset of the user A and indicated in the payment information received at step S25, to "150" that is obtained by subtracting the usage fee of "100". In addition, the balance "34500" corresponding to the asset ID "A0002" of the asset of the user B of the provider terminal 30, which is a transmission destination of the payment information, is changed to "34600" that is obtained by increasing the usage fee of "100".

Figure 14:
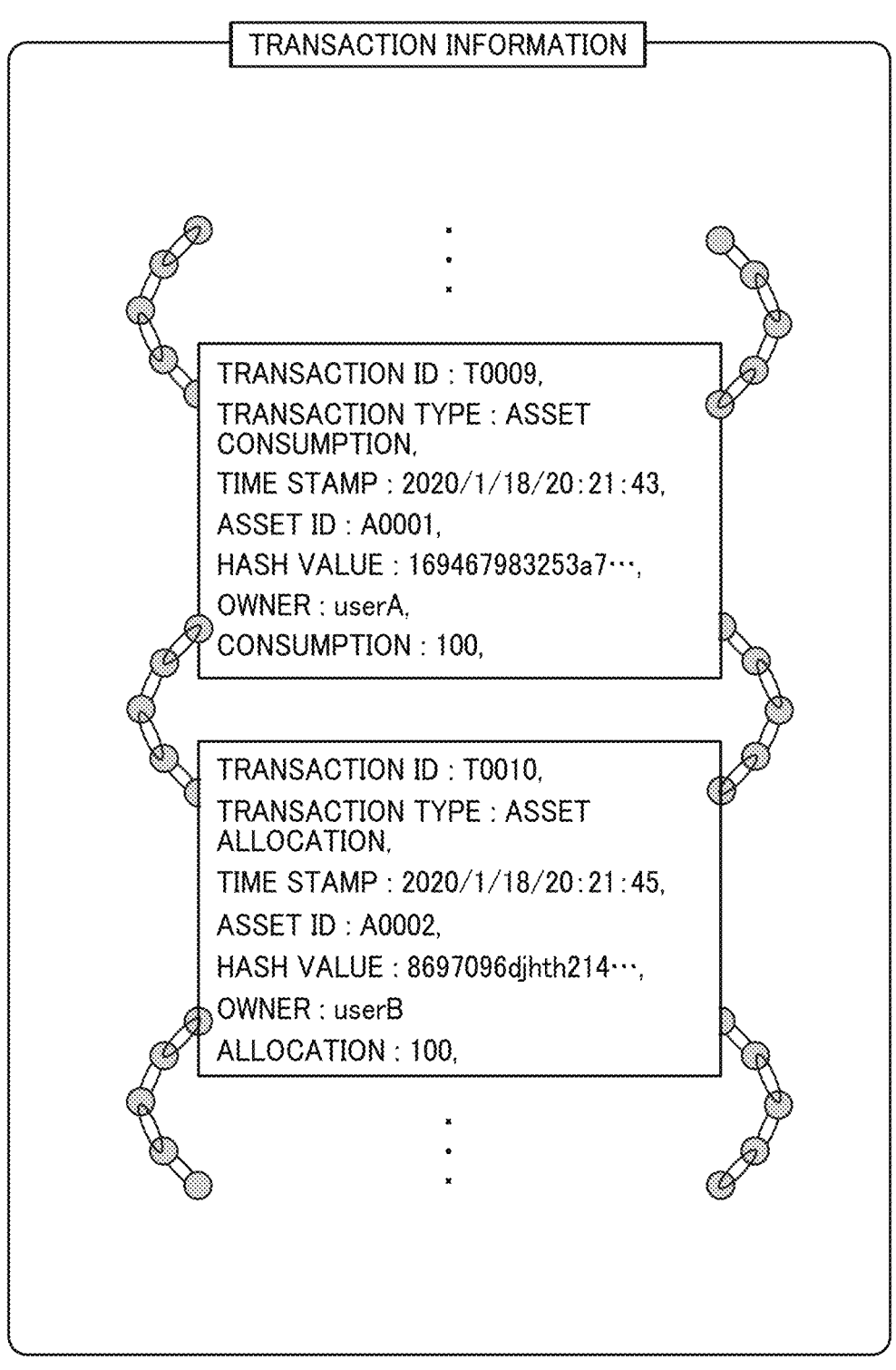
FIG. 14 is a conceptual diagram illustrating an example of transaction information stored in a node according to an embodiment.

Next, the generation unit 82 of the node 80 generates transaction information indicating a transaction history of transmission and reception of data on the blockchain 8 (step S27). Then, the storing and reading unit 89 stores the transaction information generated by the generation unit 82 in the storage unit 8000 (step S28). FIG. 14 is a conceptual diagram illustrating an example of transaction information stored in a node according to the embodiment. The transaction information stores a transaction history of currency information. The transaction information has a record, called a block, which corresponds to one transaction, and blocks are listed continuously as they increase in number. One block contains a timestamp and a link to the previous block. Once the transaction information is recorded, data in the block cannot retrospectively be altered. Therefore, the blockchain 8 can guarantee reliability of transactions by referring to the transaction information and checking its validity, by the plurality of nodes 80 of the blockchain 8.

The generation unit 82 generates a block of a new transaction, which corresponds to a transaction between the user A and the user B. As illustrated in FIG. 14, the generation unit 82 describes a transaction type "asset consumption" corresponding to processing in which the asset (currency information) of the user A is consumed at step S26, in the block with a newly assigned transaction ID "T0009". In addition, the generation unit 82 describes a time stamp "2020/01/18/20:21:43" indicating the date and time at which the asset is consumed, unique information regarding the consumed asset (the asset identifier "A0001", the hash value "169467983253a7 . . . ", and the owner "user A"), and the consumption amount "100", in the block with the transaction identifier "T0009".

Furthermore, the generation unit 82 describes a transaction type "asset allocation" corresponding to processing in which a usage fee (that is, currency information) has been paid to the user B at step S26, in the block with a newly assigned transaction identifier "T0010". In addition, the generation unit 82 describes a time stamp "2020/01/18/20: 21:45" indicating the date and time when the asset is allocated, unique information regarding the allocated asset (the asset identifier "A0002", the hash value "8697096djhth214 . . . ", and the owner "user B"), and the allocation amount "100", in the block with the transaction identifier "T0010".

Further, the node 80 of the blockchain 8 checks a content of the payment information signed using the public key, and matches the content with the transaction information, to verify that the transaction content is correct. Accordingly, since the network system 1 verifies presence or absence of unauthorized transaction by a plurality of users using the blockchain 8, impersonation by other users can be prevented, thus reducing security risks.

In a case where the service usage type is "automatic extension", the node 80 consumes and allocates currency information (asset), which is a usage fee, according to a usage time of service.

Next, the communication unit 81 of the node 80 transmits, to the provider terminal 30, a payment completion notification indicating that the payment of the usage fee has been completed (step S29). Accordingly, the network communication unit 36 of the provider terminal receives the payment completion notification transmitted from the node 80. The terminal communication unit 31 of the provider terminal 30 transmits an Internet use permission notification indicating that use of the Internet is permitted, to the user terminal 10 (step S30). The communication unit 11 of the user terminal 10 receives the Internet use permission notification transmitted from the provider terminal 30.

In response to receiving the payment completion notification at step S29, the service providing unit 35 of the provider terminal 30 executes connection control processing for connecting the user terminal 10 to the Internet 5 (step S31). For example, the service providing unit 35 performs control to change the setting of the port filter and to permit communication at a predetermined communication port.

The connection control to the Internet 5 may be implemented using OpenFlow (Registered Trademark). In Open-Flow, communication is regarded as an end-to-end flow, and path control, load distribution, optimization, and the like can be performed in units of flow. Specifically, OpenFlow is implemented by changing to a centralized control, as opposed to analyzing and transferring each data packet in an autonomous distributed manner in a relay device or the like of a data communication path. In this case, dynamic path control can be performed by providing the provider terminal 30 with functions of an OpenFlow controller and an Open-Flow switch.

Then, the provider terminals 30 provides the Internet connection service to the user terminal 10 (step S32). When the use permission notification is received, the user terminal 10 can connect to the Internet by accessing the provider terminal 30.

As described above, the provider terminal 30 performs transactions of the currency information on the blockchain 8 by using the signed payment information transmitted from the user terminal 10. This enables transactions of the currency information in which security risks are reduced in a case of providing a service to the user terminal 10.

Processing During Use of Service

Figure 15:
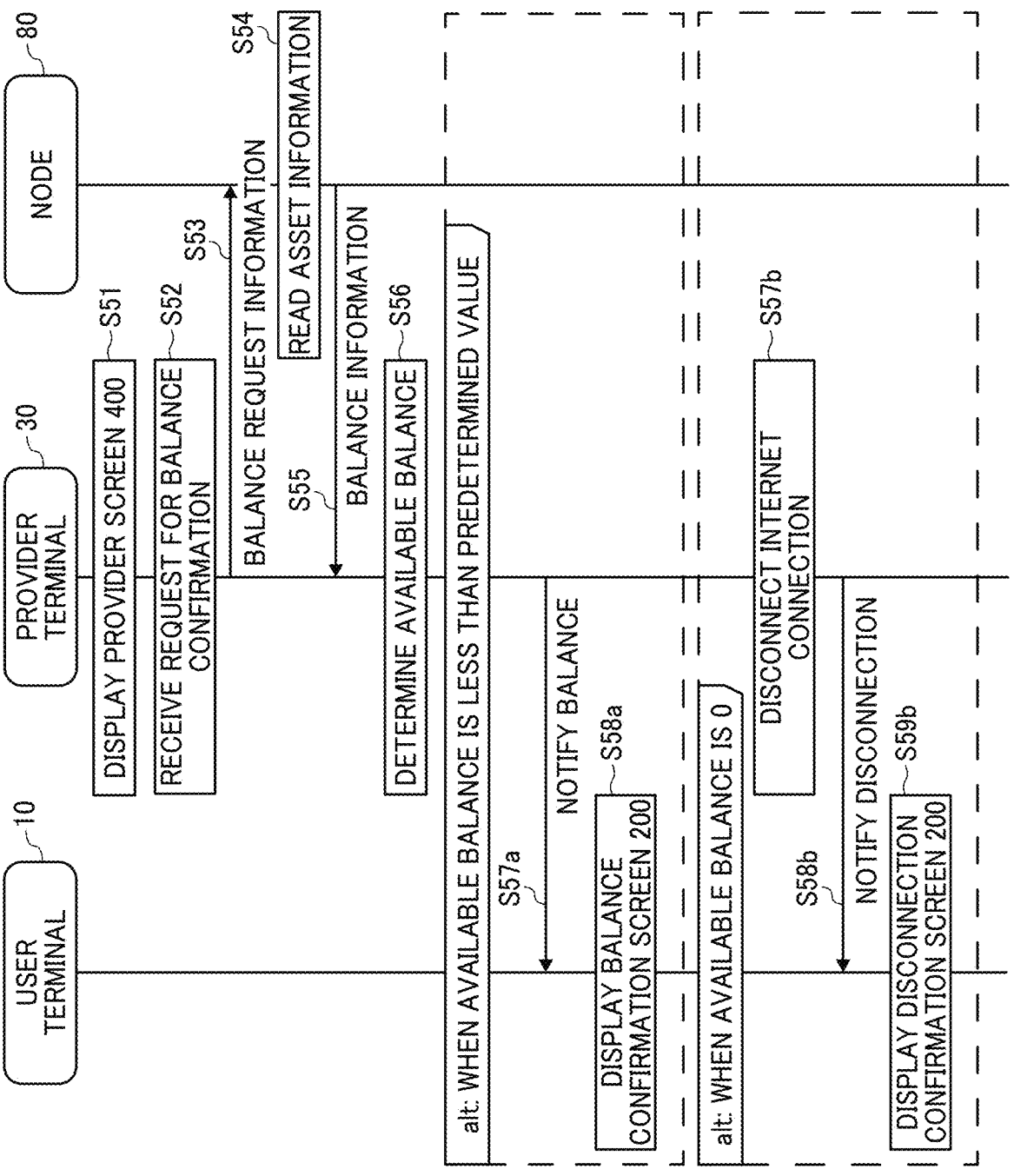
FIG. 15 is a sequence diagram illustrating an example of processing being performed during when a service is provided in the network system according to an embodiment.

Next, referring to FIGS. 15 to 17, processing performed when the user terminal 10 is using the service provided by the provider terminal 30, is described. FIG. 15 is a sequence diagram illustrating an example of processing performed while a service is being provided, at the network system, according to the embodiment.

By accessing the URL received at step S19, the provider terminal 30 causes the display 505 to display a provider screen 40 on which information regarding the service being provided is displayed (step S51). FIG. 16 is an illustration of an example provider screen displayed at the provider terminal according to the embodiment. The provider screen 400 illustrated in FIG. 16 includes a selection button 401 for selecting a user to whom a service for performing processing is provided, a "check balance" button 405 to be pressed when requesting confirmation of a usage fee balance of the selected user, a "request disconnection" button 407 to be pressed when requesting disconnection of the Internet, and a "cancel" button 409 to be pressed when closing the provider screen 400.

Next, when the provider selects a user by the selection button 401 and presses the "check balance" button 405, the reception unit 32 receives a request for balance confirmation from the user (step S52). Then, the network communication unit 36 transmits balance request information indicating a request for information on the usage fee balance of the user A to the node 80 (step S53). The balance request information includes a user ID for identifying the user A. Accordingly, the communication unit 81 of the node 80 receives the balance request information transmitted from the provider terminal 30.

The storing and reading unit 89 of the node 80 reads the assets possessed by an owner with the user ID received at step S53, from the asset information stored in the storage unit 8000 (step S54). Then, the communication unit 81 transmits balance information indicating the balance of assets read at step S54 to the provider terminals 30 (step S55). The network communication unit 36 of the provider terminal 30 receives the balance information transmitted from the node 80.

The determination unit 34 of the provider terminal 30 uses the balance information received by the network communication unit 36 to determine the available balance for continuing the use of the service being provided (step S56). Specifically, when the determination unit 34 determines that the balance indicated in the received balance information is equal to or less than a predetermined value, the provider terminals 30 perform processing from step S57a to step S58a. In this example, the predetermined value is a value that is set in advance at the provider terminal 30 according to the usage fee of the service being used. The predetermined value is set to, for example, the lowest fee per unit time of the service. When the determination unit 34 determines that the available balance is equal to or less than the predetermined value, the user has insufficient balance in the next transaction. Therefore, the provider terminal 30 executes processing from step S57a to step S58a in order to notify the user of such fact in advance. The predetermined value may be appropriately set by the provider according to the content of the service or the like.

When the available balance is equal to or less than the predetermined value, the terminal communication unit 31 of the provider terminal 30 transmits a balance notification indicating the available balance of the user A to the user terminal 10 of the user A (step S57a). Accordingly, the communication unit 11 of the user terminal 10 receives the balance notification transmitted from the provider terminal 30. The display control unit 13 of the user terminal 10 causes the display 505 to display a balance confirmation screen 200 indicating the balance of the usage fee available to the user A (step S58a). FIG. 17A is an illustration of an example balance confirmation screen displayed at the user terminal according to the embodiment. The balance confirmation screen 200 illustrated in FIG. 17A includes a balance display field 201 for displaying the usage fee balance, a detail display field 205 for displaying information on the service being used, a "disconnect" button 207 to be pressed when the Internet connection is disconnected, and a "close" button 209 to be pressed when the balance confirmation screen 200 is closed.

Accordingly, the provider terminal 30 can notify the user of the user terminal 10 that the balance is about to run out by checking a balance of the user for service availability using the balance information transmitted from the block-chain 8.

On the other hand, in the process of step S56, when the determination unit 34 determines that the balance indicated by the received balance information is "0" (there is no balance), the provider terminal 30 executes the processes from step S57b to step S59b. Steps S57b to S59b will be described as processing to be performed when it is determined that the available balance is "0", but may be performed when it is determined that the usage fee balance is less than a predetermined value such as the minimum amount of the usage fee of the service.

When the available balance is "0", the service providing unit 35 of the provider terminal 30 disconnects the Internet connection to the user terminal 10 (step S57b). The terminal communication unit 31 transmits a disconnection notification indicating that the Internet connection has been disconnected to the user terminal 10 (step S58b). The communication unit 11 of the user terminal 10 receives the disconnection notification transmitted from the provider terminal 30. Then, the display control unit 13 of the user terminal 10 causes the display 505 to display a disconnection notification screen 250 indicating that the Internet connection has been disconnected (step S59b). FIG. 17B is an illustration of an example disconnection notification screen displayed at the user terminal according to the embodiment. The disconnection notification screen 250 illustrated in FIG. 17B indicates that the Internet connection provided by the user B has been disconnected, and includes an "OK" button 255 to be pressed when closing the disconnection notification screen 250 and a "reconnect" button 257 to be pressed when requesting the user B to reconnect to the Internet.

Accordingly, when the balance of the user for service availability is exhausted, the provider terminal 30 can stop providing the service to the user terminal 10 by disconnecting the Internet connection. When the "reconnect" button 257 is pressed, the communication unit 11 transmits a reconnection request including the user ID of the user A and the SSID to the provider terminal 30, and executes the processes from step S13 again.

As described above, during when the service is being provided to the user terminal 10, the provider terminal 30 refers to the currency information owned by the user via the blockchain 8 and confirms the balance for service availability, such that the service corresponding to the transaction status of the currency information can be provided to the user terminal 10. Although FIGS. 15 to 17 describe the processing to be performed during when the service is being provided to the user terminal 10, the provider terminal 30 may be configured to receive the balance information from the node 80 instead of the payment completion notification at step S29 and transmit the balance notification indicating the balance of the usage fee indicated in the received balance information to the user terminal 10 when the usage fee cannot be paid due to insufficient balance of the user.

As described above, the network system 1 allows transactions of currency information using the provider terminal 30 capable of communicating with the blockchain 8. Accordingly, the user terminal 10 whose connection to the blockchain 8 is restricted can easily carry out transactions of currency information, by using the service provided from the provider terminal 30. The network system 1 uses electronically signed payment information for transactions, and verifies the presence or absence of fraud by a plurality of users using the blockchain 8. This can prevent unauthorized impersonation by a third party.

The above-described description illustrates an example case in which the provider terminal 30 provides the user terminal 10a with a service to connect to the Internet, but the service provided from the provider terminal 30 to the user terminal 10 is not limited to this example. The service provided from the provider terminal 30 to the user terminal 10 may be, for example, any service in which the provider terminal 30 provides a particular transaction item through a website on the Internet, for example. Examples of such particular transaction item include, but not limited to, electronic data such as an electronic book, video image data, still image data, music data, voice data, or document data.

Further, the service provided from the provider terminal 30 to the user terminal 10 may be, for example, a service directly provided from the provider terminal 30 to the user terminal without using the communication network. For example, in the network system 1, the provider terminal 30 may provide a service (for example, a wireless charging service), such that electric power is supplied to the user terminal 10, which has completed payment of the currency information. In this case, when the payment completion notification is received by the communication unit 31, the service providing unit 35 of the provider terminal 30 supplies electric power to the user terminal 10.

Furthermore, in the network system 1, the provider terminal 30 may provide a service, such that the provider terminal 30 intermediates transactions of electric power between the user terminal 10 that has completed payment of currency information and an electric power producer such as an electric power supplier. In this case, the provider using the provider terminal 30 is an electric power retailer (intermediary agent) that intermediates transfer between the electric power producer and the user.

As described above, the provider terminal according to one or more embodiments of the present invention is the provider terminal 30 capable of communicating with the blockchain 8 that manages the currency information owned by the user. The provider terminal 30 includes a terminal communication unit 31 (an example of terminal communication means) that receives use request information indicating a request to use a particular service from the user terminal 10, and a network communication unit 36 (an example of network communication means) that transmits payment information indicating a usage fee for the particular service corresponding to the received use request information to the blockchain 8. The provider terminal 30 includes a service providing unit 35 (an example of service providing means) that provides a particular service to the user terminal 10 in response to reception of a payment completion notification from the blockchain 8, which indicates that payment of the usage fee has been completed. Accordingly, the provider terminal 30 carriers out transactions of currency information on the blockchain 8 based on the service use request transmitted from the user terminal 10. This can reduce security risks in transactions of the currency information when providing the service to the user terminal 10.

In the provider terminal according to an embodiment of the present invention, the terminal communication unit 31 (an example of terminal communication means) transmits to the user terminal 10 an application URL (an example of connection destination information) indicating a connection destination of an application corresponding to a user, and receives payment information input to the connection destination from the user terminal 10. Then, the network communication unit 36 (an example of network communication means) transmits the received payment information to the blockchain 8. Further, the network communication unit 36 receives an application URL from an application management apparatus 70 (an example of a management apparatus) that manages applications available to the user. The terminal communication unit 31 transmits the application URL received by the network communication unit 36 to the user terminal 10. The provider terminal 30 transmits information on the specific connection destination for paying a usage fee to the user terminal 10 whose connection to the blockchain 8 is restricted. This allows the user to pay a usage fee while keeping a certain security level.

Further, in the provider terminal according to an embodiment of the present invention, the payment information is data electronically signed by the user terminal 10 using a private key. The provider terminal 30 uses the payment information electronically signed by the user terminal 10 for transactions on the blockchain 8, thus preventing unauthorized impersonation by a third party.

In the provider terminal according to an embodiment of the present invention, the network communication unit 36 (an example of network communication means) receives balance information indicating the balance of the currency information of the user of the user terminal 10 from the blockchain 8. The terminal communication unit 31 (an example of terminal communication means) transmits a balance notification to the user terminal 10 in a case where the balance indicated by the balance information received by the network communication unit 36 is equal to or less than a predetermined value. When the balance indicated by the balance information is less than the predetermined value, such as a minimum usage fee of the service, the provider terminal 30 stops providing the particular service. Accordingly, when the balance of the user for service availability is exhausted, the provider terminal 30 can stop providing the service to the user terminal 10 by disconnecting the Internet connection.

Further, examples of a network system according to an embodiment of the present invention include a network system 1 including the user terminal 10 and the provider terminal 30 capable of communicating with the blockchain 8 that manages currency information. The user terminal 10 accesses the application URL (an example of the connection destination information) transmitted from the provider terminal 30 to display the payment screen 150 for inputting data of the usage fee, and generates payment information in which the data input to the payment screen 150 is electronically signed using the private key. Then, the user terminal 10 transmits the generated payment information to the provider terminal 30. In the network system 1, transactions of currency information between the user terminal 10 and the provider terminal 30 are carried out via the provider terminal 30 capable of communicating with the blockchain 8. This can lower security risks in transactions of the currency information, in a case where the user terminal 10 whose connection to the blockchain 8 is restricted uses services provided from the provider terminal 30. The network system 1 uses electronically signed payment information for transactions, and verifies the presence or absence of fraud by a plurality of users using the blockchain 8. This can prevent unauthorized impersonation by a third party.

Each of the functions of the embodiments described above can be implemented by one or more processing circuits or circuitry. In this disclosure, processing circuitry includes a programmed processor, as a processor includes circuitry. A processing circuit also includes devices such as an ASIC (application specific integrated circuit), DSP (digital signal processor), FPGA (field programmable gate array), and conventional circuit components arranged to perform the recited functions.

Further, various tables of any one of the above-described embodiments may be generated by machine learning, and data of associated items can be classified such that use of tables can be optional. In the present disclosure, machine learning is a technique that enables a computer to acquire human-like learning ability. Machine learning refers to a technology in which a computer autonomously generates an algorithm required for determination such as data identification from learning data loaded in advance, and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

The provider terminal, the network system, the service providing method, and the program according to one or more embodiments of the present invention have been described above. For example, elements and/or features of different illustrative embodiments may be combined with each other and/or substituted for each other within the scope of the present invention. Any one of the above-described operations may be performed in various other ways, for example, in an order different from the one described above.

In one embodiment, for example, a provider terminal (an example of first communication terminal) is provided, which is capable of communicating with a blockchain (an example of management system) that manages currency information owned by a user. The provider terminal includes: terminal communication means for receiving use request information indicating a request to use a particular service from a user terminal (an example of second communication terminal), the user terminal being restricted from accessing the blockchain on a communication network; network communication means for transmitting, to the blockchain, payment information indicating a usage fee of the particular service (such as information indicating an amount of currency information for using the particular service) corresponding to the received use request information; and service providing means for providing the particular service to the user terminal in response to reception of a payment completion notification transmitted from the blockchain, the payment completion notification indicating that payment of the usage fee is completed. That is, the payment completion notification indicates completion of transfer of currency information for the amount indicated by the payment information. Specifically, the payment completion notification indicates completion of payment of the usage fee by the user.

In one example, at the provider terminal, the terminal communication means transmits to the user terminal connection destination information indicating a connection destination of an application corresponding to the user, and receives the payment information input to the connection destination from the user terminal, and the network communication means transmits the received payment information to the blockchain.

More specifically, using the connection destination information, the user terminal accesses the connection destination to cause the application to display a screen for allowing the user to input information to be used for transfer of currency information, and transmits data based on the information input by the user.

In one example, at the provider terminal, the network communication means receives the connection destination information from a management apparatus that manages an application available to the user, and the terminal communication means transmits the connection destination information received at the network communication means to the user terminal.

In one example, at the provider terminal, the payment information is data electronically signed by the user terminal with a private key.

In one example, the service providing means causes the user terminal to connect to the Internet in response to reception of the payment completion notification.

In one example, at the provider terminal, the network communication means receives balance information indicating a balance of the currency information of the user of the user terminal from the blockchain, and the terminal communication means transmits to the user terminal a balance notification indicating a balance of the balance information received by the network communication means.

In one example, at the provider terminal, the terminal communication means transmits the balance notification to the user terminal, in a case that the balance of the balance information received by the network communication means is equal to or less than a predetermined value.

In one example, at the provider terminal, in a case that the balance of the balance information is less than an amount of the usage fee, the service providing means stops providing the particular service to the user terminal.

In one example, at the provider terminal, the service providing means provides the particular service provided from the provider terminal to the user terminal.

In one example, at the provider terminal, the service providing means connects the user terminal to the Internet on the communication network via the provider terminal.

In another embodiment, for example, a network system is provided, which includes a user terminal restricted from accessing a blockchain on a communication network, and a provider terminal capable of communicating with the blockchain that manages currency information. The network system includes: terminal communication means for receiving use request information indicating a request to use a particular service from the user terminal; network communication means for transmitting, to the blockchain, payment information indicating a usage fee of the particular service corresponding to the received use request information; and service providing means for providing the particular service to the user terminal in response to reception of a payment completion notification transmitted from the blockchain, the payment completion notification indicating that payment of the usage fee is completed.

In one example, at the network system, the terminal communication means further transmits to the user terminal connection destination information indicating a connection destination of an application corresponding to the user. The user terminal further includes display means for displaying a payment screen for inputting data of the usage fee by accessing the connection destination.

In one example, at the network system, the user terminal further includes: generation means for generating the payment information in which data input to the payment screen is digitally signed using a private key; and transmission means for transmitting the payment information to the provider terminal.

In one embodiment, a service providing method performed by a provider terminal capable of communicating with a blockchain that manages currency information owned by a user, is provided. The service providing method includes: receiving use request information indicating a request to use a particular service from a user terminal, the user terminal being restricted from accessing the blockchain on a communication network; transmitting, to the blockchain, payment information indicating a usage fee of the particular service corresponding to the received use request information; and providing the particular service to the user terminal in response to reception of a payment completion notification transmitted from the blockchain, the payment completion notification indicating that payment of the usage fee is completed.

In one embodiment, a computer program for causing a provider terminal capable of communicating with a blockchain that manages currency information owned by a user to perform a method is provided. The method includes: receiving use request information indicating a request to use a particular service from a user terminal, the user terminal being restricted from accessing the blockchain on a communication network; transmitting, to the blockchain, payment information indicating a usage fee of the particular service corresponding to the received use request information; and providing the particular service to the user terminal in response to reception of a payment completion notification transmitted from the blockchain, the payment completion notification indicating that payment of the usage fee is completed.

The invention claimed is:

1. A system, comprising:
a first communication terminal communicably connected with a blockchain system that manages currency information, the first communication terminal including first circuitry;
a second communication terminal communicably connected with the first communication terminal, the second communication terminal including second circuitry; and
a management apparatus including third circuitry configured to transmit an application link to the first communication terminal, wherein
the first circuitry receives the application link from the management apparatus and transmits the application link to the second communication terminal,
the second circuitry is configured to
transmit use request information indicating a use request for using a particular service to the first communication terminal in response to a user operation on the second communication terminal,
receive the application link from the first communication terminal,
activate the application link to output a payment screen via a display,
receive a user input to the payment screen, the user input indicating the use request information,
generate payment information indicating a usage fee of the particular service corresponding to the use request information, and
transmit the payment information to the first communication terminal, the first circuitry is configured to
receive the use request information from the second communication terminal,
display a screen including a button for accepting the use request from the first communication terminal,
transmit a request for application to the management apparatus in response to operating the button,
receive the payment information,
transmit the payment information to the blockchain system,
receive a notification from the blockchain system, the notification indicating completion of payment of the usage fee of the particular service, and
provide the particular service to the second communication terminal in response to reception of the notification from the blockchain system, and
the second circuitry is restricted from directly communicating with the blockchain system.

2. A communication terminal communicably connected with a blockchain system that manages currency information and a user terminal which is restricted from directly communicating with the blockchain system, the communication terminal comprising:
circuitry configured to:
receive, from the user terminal, use request information indicating a use request for using a particular service;
display a screen including a button for accepting the use request from the user terminal;
transmit a request for application to a management apparatus in response to operating the button;
receive an application link from the management apparatus;
transmit the application link to the user terminal, the application link causing the user terminal to display a payment screen when activated;

receive, from the user terminal, payment information generated by the user terminal, wherein the payment information indicates a usage fee for using the particular service, the particular service corresponding to use request information;

transmit the payment information to the blockchain system;

receive a notification from the blockchain system, the notification indicating completion of payment of the usage fee of the particular service; and provide the particular service to the user terminal in response to reception of the notification from the blockchain system.

3. The communication terminal of claim 2, wherein the circuitry is configured to store information on an application available to the user.

4. The communication terminal of claim 2, wherein input information is input by the user at the user terminal, the input information is electronically signed by the user terminal with a private key, and the user terminal generates the payment information based on the input information.

5. The communication terminal of claim 2, wherein the circuitry receives balance information indicating a balance of currency information of the user from the blockchain system, and the circuitry transmits to the user terminal another notification indicating the balance of the user.

6. The communication terminal of claim 5, wherein the circuitry transmits the other notification to the user terminal, in a case that the balance is equal to or less than a predetermined value.

7. The communication terminal of claim 5, wherein the circuitry is further configured to stop providing the particular service to the user terminal in a case that the balance is less than the usage fee of the particular service.

8. The communication terminal of claim 2, wherein the communication terminal provides the particular service to the user terminal, in response to reception of the notification indicating a completion of a transfer of the currency information between the user terminal and the communication terminal based on the payment information.

9. The communication terminal of claim 2, wherein the particular service is a service for enabling the user terminal to connect to the Internet.

10. The communication terminal of claim 9, wherein the service for enabling the user terminal to connect to the Internet causes the user terminal to connect to the Internet via the communication terminal.

11. A method for providing a service, performed by a communication terminal communicably connected with a blockchain system that manages currency information and a user terminal which is restricted from directly communicating with the blockchain system, the method comprising:

receiving, from the user terminal, use request information indicating a use request for using a particular service;

displaying a screen including a button for accepting the use request from the user terminal;

transmitting a request for application to a management apparatus in response to operating the button;

receiving an application link from the management apparatus;

transmitting the application link to the user terminal, the application link causing the user terminal to display a payment screen when activated;

receiving, from the user terminal, payment information generated by the user terminal, wherein the payment information indicates a usage fee for using the particular service, the particular service corresponding to use request information;

transmitting the payment information to the blockchain system;

receiving a notification from the blockchain system, the notification indicating completion of payment of the usage fee of the particular service; and providing the particular service to the user terminal in response to reception of the notification from the blockchain system.

12. A non-transitory recording medium storing a plurality of instructions which, when executed by one or more processors, cause the processors on a communication terminal to perform a method for providing a service, the communication terminal being communicably connected with a blockchain system that manages currency information and a user terminal which is restricted from directly communicating with the blockchain system, the method comprising:

receiving, from the user terminal, use request information indicating a use request for using a particular service;

displaying a screen including a button for accepting the use request from the user terminal;

transmitting a request for application to a management apparatus in response to operating the button;

receiving an application link from the management apparatus;

transmitting the application link to the user terminal, the application link causing the user terminal to display a payment screen when activated;

receiving, from the user terminal, payment information generated by the user terminal, wherein the payment information indicates a usage fee for using the particular service, the particular service corresponding to use request information;

transmitting the payment information to the blockchain system;

receiving a notification from the blockchain system, the notification indicating completion of payment of the usage fee of the particular service; and providing the particular service to the user terminal in response to reception of the notification from the blockchain system.

13. The system of claim 1, wherein the second circuitry is further configured to generate the payment information based on the data input by the user that is digitally signed using a private key, and transmit the payment information to the first communication terminal.

14. The communication terminal of claim 2, wherein the communication terminal causes the user terminal to connect to the Internet in response to reception of the notification indicating completion of payment of the usage fee of the particular service.

15. The communication terminal of claim 8, wherein the transfer of currency information includes processing to update the currency information possessed by the user of the user terminal to have an amount from which the usage fee for the particular service is subtracted, and processing to update the currency information possessed by the provider of the communication terminal to have an amount to which the usage fee for the particular service is added.

16. The system of claim 1, wherein the second circuitry is limited by a port filter to only access the application link.

17. The system of claim 16, wherein in response to a payment completion, the port filter allows the second circuitry to access the Internet.

* * * * *